US008073462B2

(12) United States Patent
Yamamoto et al.

(10) Patent No.: US 8,073,462 B2
(45) Date of Patent: Dec. 6, 2011

(54) COMMUNICATION SYSTEM FOR SELECTING COMMUNICATION METHOD

(75) Inventors: Junji Yamamoto, Tokyo (JP); Seishi Hanaoka, Tokyo (JP); Ryouji Yamaoka, Chiba (JP); Tetsuo Yamaoka, legal representative, Chiba (JP)

(73) Assignee: Hitachi, Ltd., Tokyo (JP)

( * ) Notice: Subject to any disclaimer, the term of this patent is extended or adjusted under 35 U.S.C. 154(b) by 612 days.

(21) Appl. No.: 12/222,954

(22) Filed: Aug. 20, 2008

(65) Prior Publication Data

US 2009/0061893 A1 Mar. 5, 2009

(30) Foreign Application Priority Data

Aug. 27, 2007 (JP) ................................. 2007-219979

(51) Int. Cl.
*H04W 4/02* (2009.01)
(52) U.S. Cl. ...................... 455/456.1; 455/458; 455/574
(58) Field of Classification Search ............... 455/456.1, 455/458, 574, 436–439; 370/330, 331
See application file for complete search history.

(56) References Cited

U.S. PATENT DOCUMENTS

| 5,799,256 | A  | * | 8/1998  | Pombo et al. | ................. 455/574 |
| 6,212,398 | B1 | * | 4/2001  | Roberts et al. | ................ 455/502 |
| 6,677,895 | B1 | * | 1/2004  | Holt | ......................... 342/357.31 |
| 2004/0057408 | A1 | * | 3/2004  | Gray | ............................. 370/338 |
| 2006/0227744 | A1 | * | 10/2006 | Metke et al. | .................. 370/331 |
| 2008/0025238 | A1 | * | 1/2008  | McCown et al. | ............ 370/308 |
| 2008/0049675 | A1 | * | 2/2008  | Burgan et al. | ................. 370/331 |
| 2008/0207260 | A1 | * | 8/2008  | Dent | ......................... 455/556.1 |

FOREIGN PATENT DOCUMENTS

JP 2005-080071 9/2003
JP 2007-049645 8/2005

* cited by examiner

*Primary Examiner* — Cong Tran
(74) *Attorney, Agent, or Firm* — Crowell & Moring LLP

(57) ABSTRACT

There is provided a communication system including a base station and a terminal which communicates with the base station through a plurality of communication methods. The base station is configured to predict a position of the terminal; select a communication method optimal for the terminal based on the predicted position; and notify the terminal of the selected communication method. The terminal is configured to measure the position of the terminal by prediction which is similar to the position prediction by the base station; and select the communication method notified from the base station in the case of which a difference between a result of the position prediction and a result of the measurement is smaller than a predetermined threshold.

14 Claims, 23 Drawing Sheets

US 8,073,462 B2

COMMUNICATION SYSTEM FOR SELECTING COMMUNICATION METHOD

CLAIM OF PRIORITY

The present application claims priority from Japanese patent applications JP 2007-219979 filed on Aug. 27, 2007, the content of which are hereby incorporated by reference into this application.

BACKGROUND OF THE INVENTION

This invention relates to a communication system in a system which includes a plurality of communication methods, and more particularly, to a system for selecting a communication method.

In cellular communication, a terminal generally has a sleep mechanism for suppressing power supply consumption by keeping, when not engaged in communication, only minimum necessary functions active while supplying no power supply to the other portions. In a sleep status, the cellular terminal starts a receiver only at a timing when a cellular base station periodically transmits information called paging to check presence of communication.

One of the methods for setting a wireless system usable by the conventional terminal is a method of detecting electric waves emitted from the base station. According to this method, frequencies possibly used by the base station are sequentially searched to detect communicable frequencies, thereby setting a base station to which communication is performed.

A technology of setting a base station based on a positioning result of a terminal position (e.g., JP 2005-80071 A) is available. FIG. 16 illustrates an operation of this technology. According to this technology, upon generation of a communication request 935, whether a terminal is located in a wireless LAN area is searched for from a map recording the wireless LAN area which has been held in the terminal based on a positioning result of a GPS receiver (936). If the terminal is located in the wireless LAN area, communication is tried through a wireless LAN.

A technology of notifying information regarding an area where a wireless LAN can be used from a base station, and trying use of the wireless LAN if a terminal is in the area (e.g., JP 2007-49645 A) is available. FIG. 17 illustrates an operation of this technology. According to this technology, the base station notifies information on whether a wireless LAN access point is present in each area (937). The terminal obtains information on an area where the terminal is present from the notified information, and conducts hand over to the wireless LAN if the wireless LAN can be used (939). Thereafter, in this area, communication is carried out by using the wireless LAN (938).

SUMMARY OF THE INVENTION

However, to judge whether communication by the communication system is permitted by detecting electric waves from the base station, power supply has to be supplied to a receiver corresponding to the communication system, thereby creating a difficulty in power supply saving using the sleep status.

When the base station instructs hand over, a position of the terminal has to be known. Thus, the terminal has to transmit position information.

In the case of the system for enabling the terminal to set the communication system by using the map, map data has to be held in the terminal of a limited storage capacity.

When the base station notifies information regarding an area, the terminal receives the information. Thus, a period of starting for reception from the sleep status is longer than that in the case of receiving only paging, thereby increasing power supply consumption.

A representative aspect of this invention is as follows. That is, there is provided a communication system including: a base station and a terminal which communicates with the base station through a plurality of communication methods. The base station is configured to predict a position of the terminal; select a communication method optimal for the terminal based on the predicted position; and notify the terminal of the selected communication method. The terminal is configured to measure the position of the terminal by prediction which is similar to the position prediction by the base station; and select the communication method notified from the base station in the case of which a difference between a result of the position prediction and a result of the measurement is smaller than a predetermined threshold.

According to this invention, without starting a plurality of communication methods, a quick communication start using each communication method and suppression of power supply consumption can both be realized.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

The preferred embodiments of this invention will be described below using the drawings.

First Embodiment

Figure 11:
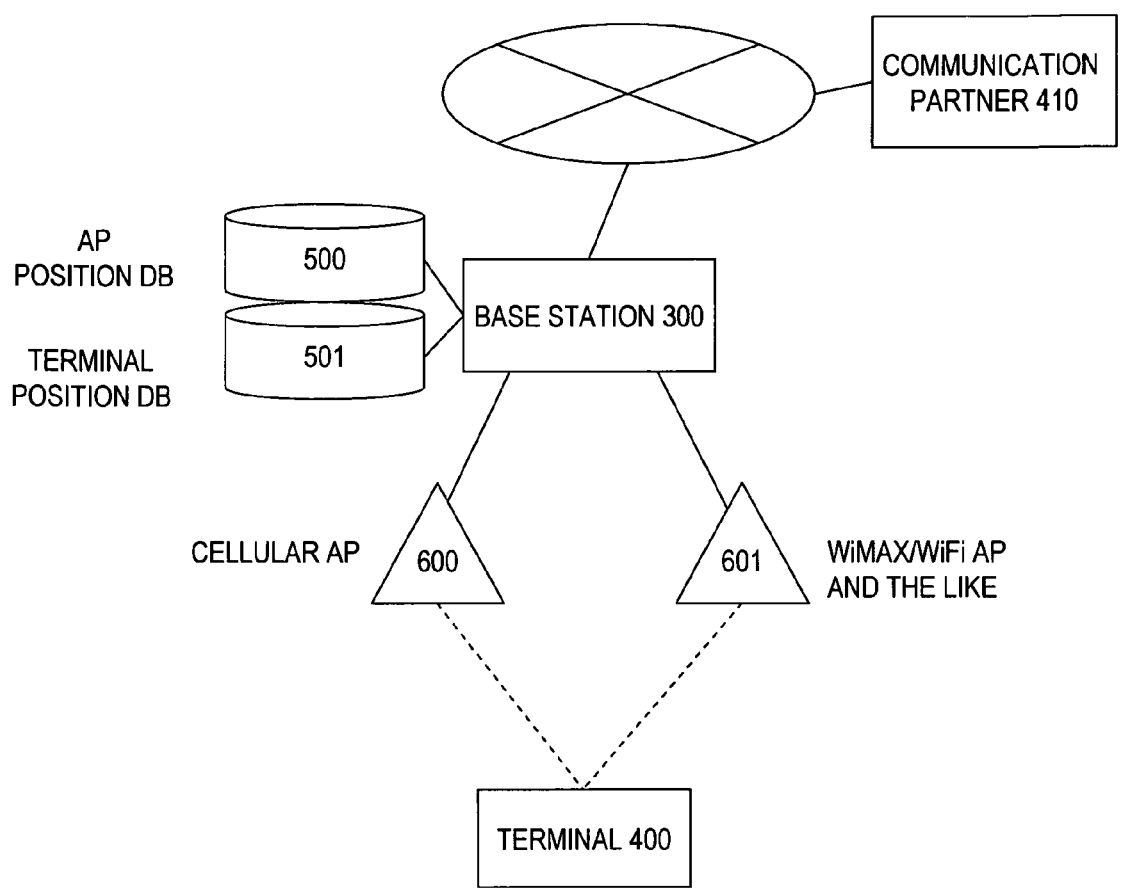
FIG. 11 is a diagram showing a system configuration example according to the embodiment of this invention.

FIG. 11 shows a system configuration example according to this embodiment.

A base station 300 includes at least one access point 600 of a cellular system which covers a wide area, and at least one access point 601 which cover a narrower area as compared with the cellular system. A terminal 400 communicates with a correspondent node 410 via the cellular access point 600 or the other proper access point 601, and the base station 300. The base station 300 holds an access point position database 500 for recording a geographical position of its subordinate access point, and a terminal position database 501 for recording a position of a terminal which has registered a position through each access point.

Figure 1:
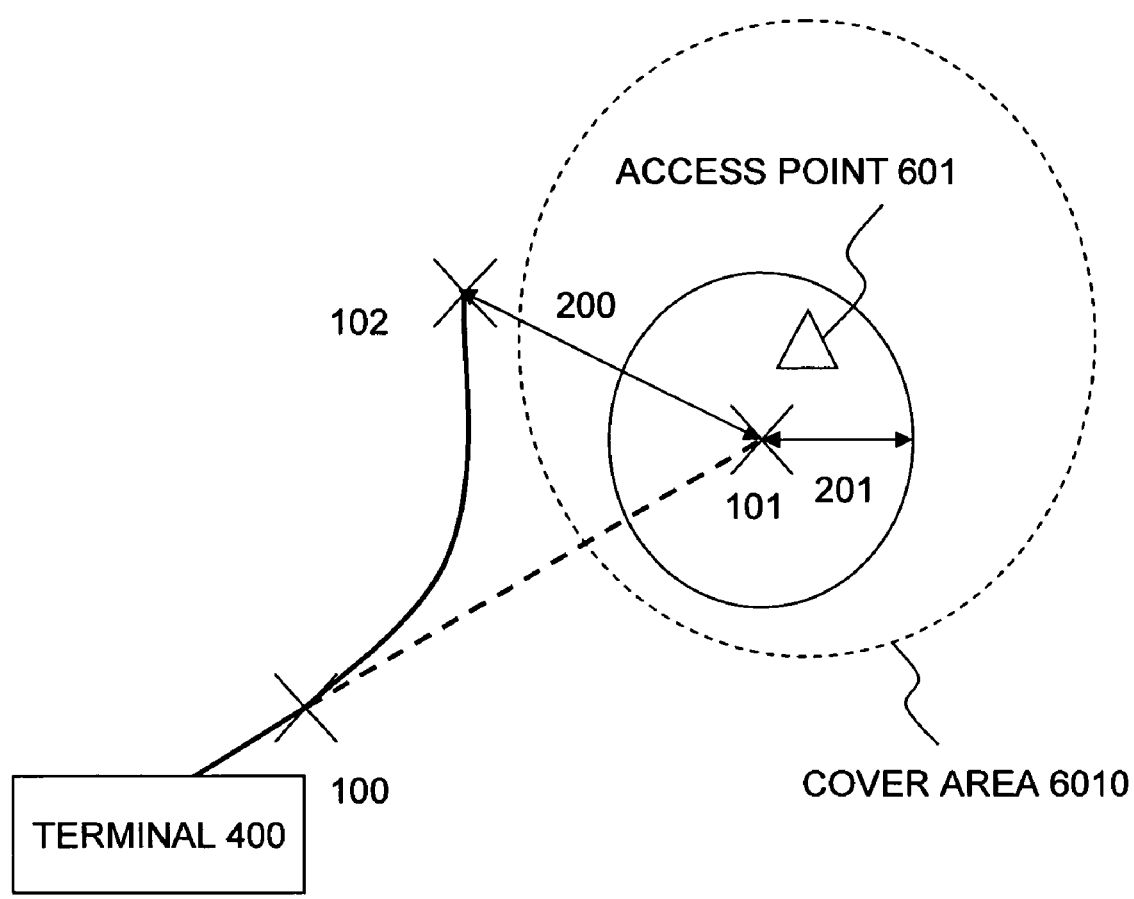
FIG. 1 is an operation conceptual diagram according to embodiments of this invention.

Referring to FIGS. 1 and 11, an operation example of this embodiment will be described.

It is presumed that the terminal 400 moves while communicating, and is set in a sleep status after last position registration in a position 100. The sleep status is a status where the terminal makes no call including position registration.

Then, when communicating with the terminal 400, the correspondent node 410 first has to release the sleep status of the terminal 400, and has to connect the terminal 400 with a proper access point to communicate.

The base station 300 obtains position registration history of the terminal 400 from the terminal position database 501, and predicts a position 101 of the terminal 400 at present based on the obtained position registration history. The base station 300 obtains a proper access point 601 for communication with the terminal 400 from the access point position database 500. The base station 300 notifies, from the cellular access point 600, the terminal 400 of a communication start with information on a communication method contained in a paging packet 70 described below.

Upon reception of the notification of the communication start from the base station 300 through the cellular access point 600, the terminal 400 calculates the predicted position 101 by the same prediction method as that of the base station 300. Simultaneously, the terminal 400 obtains a current position 102 by positioning. The calculation of a predicted position and the positioning of a current position are obtained substantially simultaneously within a permissible range of an error 200.

Subsequently, an error 200 between the predicted position 101 and the actual measured position 102 is obtained. If the error 200 exceeds a permissible value 201, prediction of the base station 300 is incorrect, and thus the terminal 400 starts communication through the cellular access point 600. On the other hand, if the error 200 is equal to or less than the permissible value 201, prediction of the base station 300 is correct, and thus the terminal 400 starts communication through the access point 601 based on the notified communication method.

Figure 10:
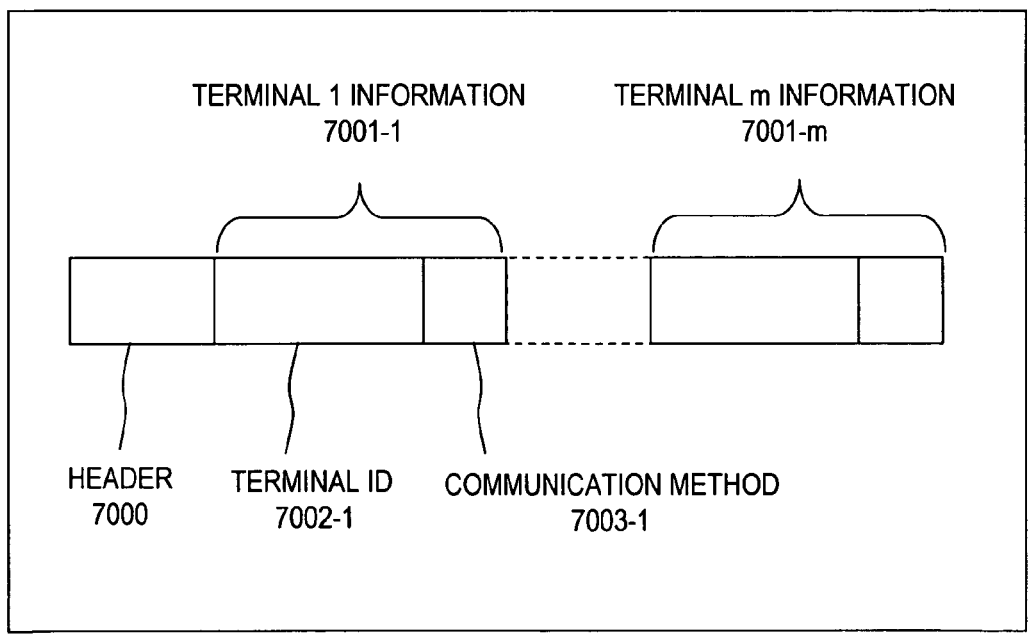
FIG. 10 is a diagram showing a configuration example of a paging packet according to the first and second embodiments of this invention.

FIG. 10 shows a configuration example of the paging packet 70 transmitted from the cellular access point 600.

The paging packet 70 includes a header 7000, and a plurality of pieces of terminal information 7001-1 to 7001-$m$. The terminal information 7001 contains a terminal ID 7002 and a communication method 7003. Subscripts of the terminal information 7001, the terminal ID 7002, and the communication method 7003 are omitted when no distinction is necessary for the description.

The header 7000 is an existing header compliant with a predetermined communication protocol. The terminal information 7001 is information on a called terminal. The terminal ID 7002 is an identifier of the called terminal. The communication method 7003 is a communication method optimal for the called terminal.

The communication method 7003 includes information necessary for communication with the access point 601 selected as an optimal access point by the base station 300. For example, the information is an ID or a type of the access point 601. A plurality of pieces of communication method information may be supplied for one terminal ID.

FIG. 10 shows the example where each terminal information 7001 contains the terminal ID 7002 and the communication method 7003. However, a terminal ID list and a communication method list may be stored together in another place of the packet.

Figures 15A, 15B:
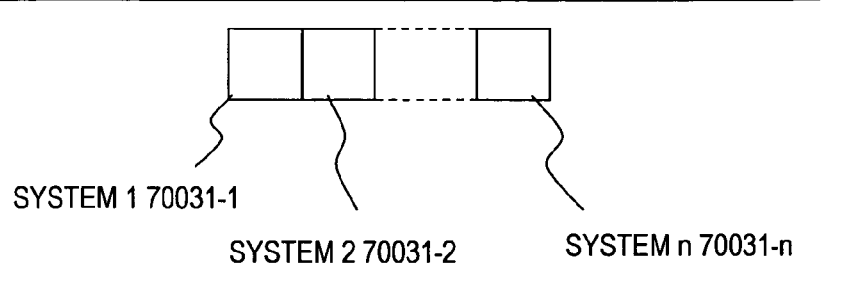
FIG. 15A is a diagram showing a configuration example of a communication system field according to the embodiments of this invention.
FIG. 15B is a diagram showing a configuration example of a communication system field according to the embodiments of this invention.
Figure 16:
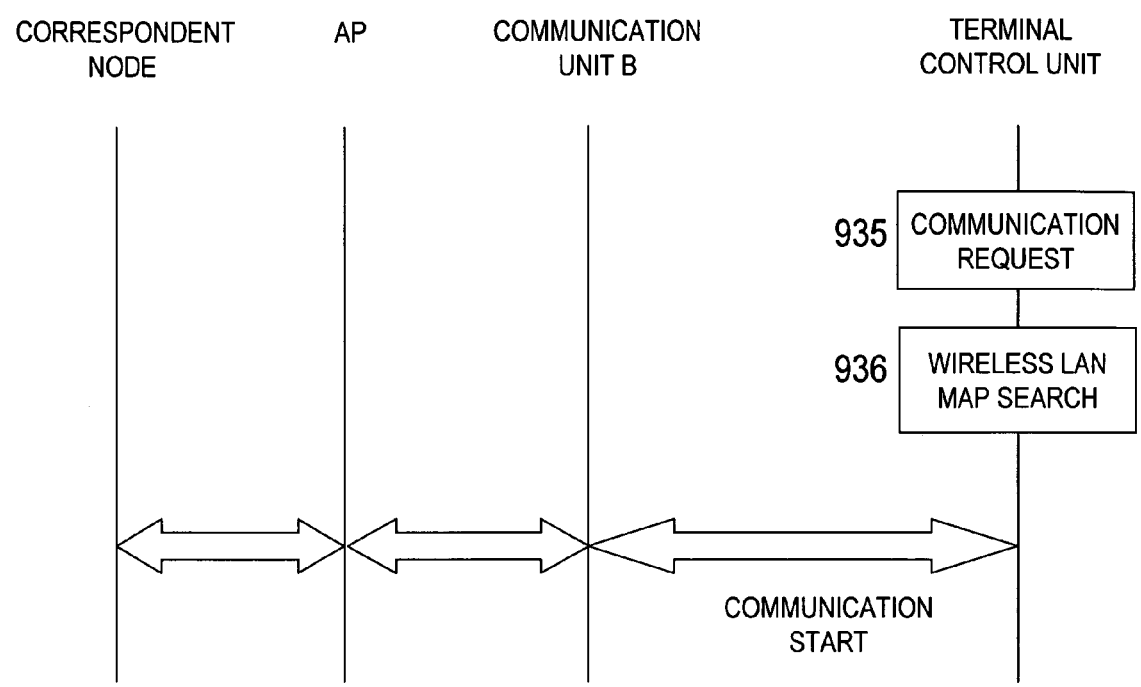
FIG. 16 is a diagram showing a communication method selection system according to a conventional technology.
Figure 17:
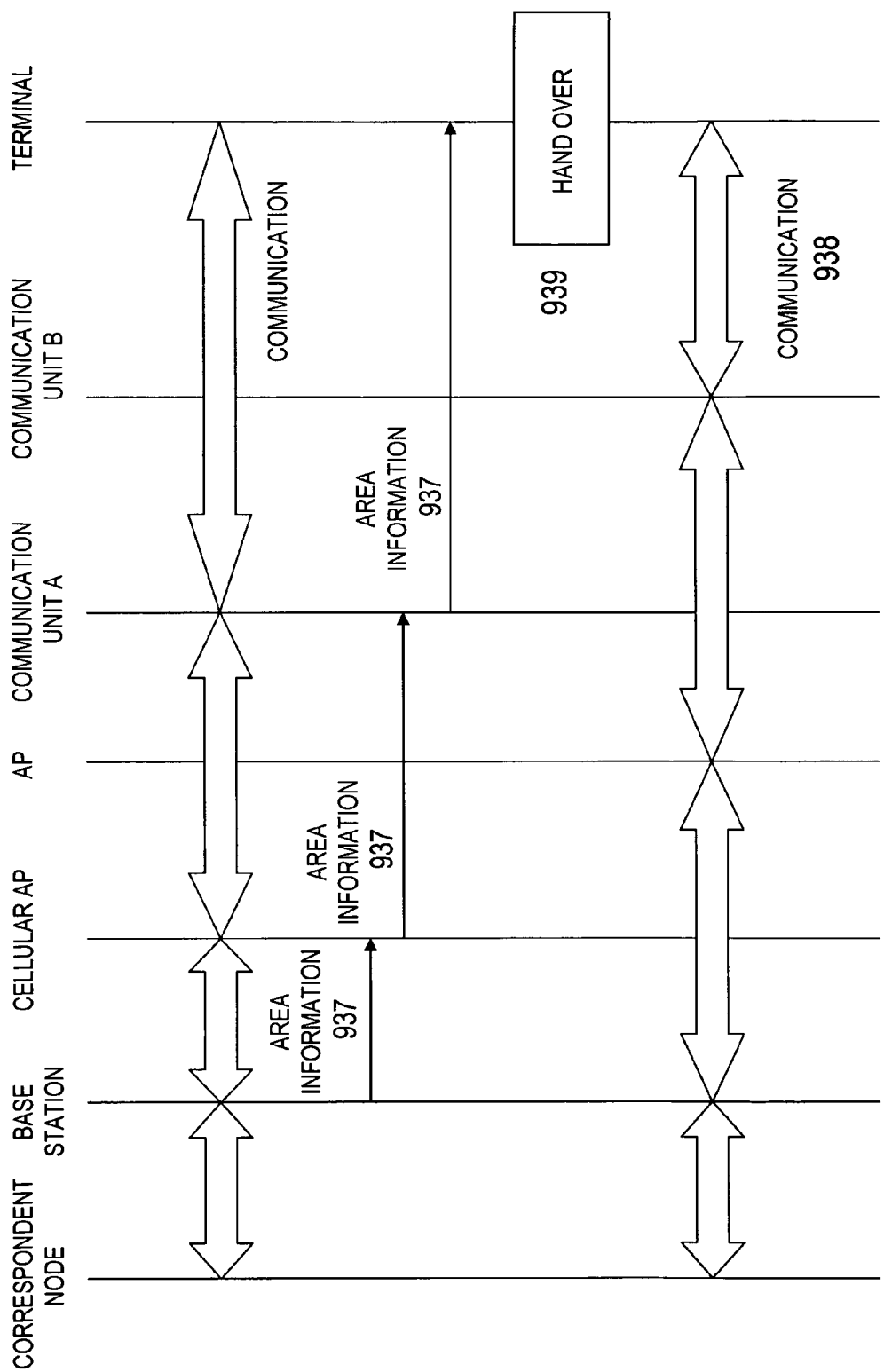
FIG. 17 is a diagram showing a communication method selection system according to a conventional technology.

FIGS. 15A and 15B show implementation examples of communication methods.

FIG. 15A shows a method of indicating each communication method 7003-1 by a flag.

According to this system, a communication method is allocated to each flag. For example, a flag 70031-1 is WiMAX (registered trademark), and a flag 70031-2 is a wireless LAN. The flag system shown in FIG. 15A enables simultaneous designation of a plurality of communication methods. Thus, according to the flag system, communication can be performed through an optimal system by comparing an error with a permissible value in order of systems rated optimal on the terminal side among systems corresponding to the flags.

However, because there is a limit on the number of flags, allocation of many systems is difficult, thereby reducing extendability.

FIG. 15B shows a method of indicating each communication method by a value.

According to this system, a communication method field 7003-2 is regarded as one value, and a communication method is allocated to each value. For example, a value 1 is WiMAX (registered trademark), and a value 2 is a wireless LAN.

This system enables allocation of the number of systems obtained by raising 2 to the number of bits of the field. Thus, more systems can be allocated as compared with a field length. On the other hand, because one communication system is designated for the entire field, a plurality of options cannot be presented to the terminal.

This invention is not limited to a communication method implementation system, and thus a communication method will be referred to as 7003 hereinbelow.

Figure 2:
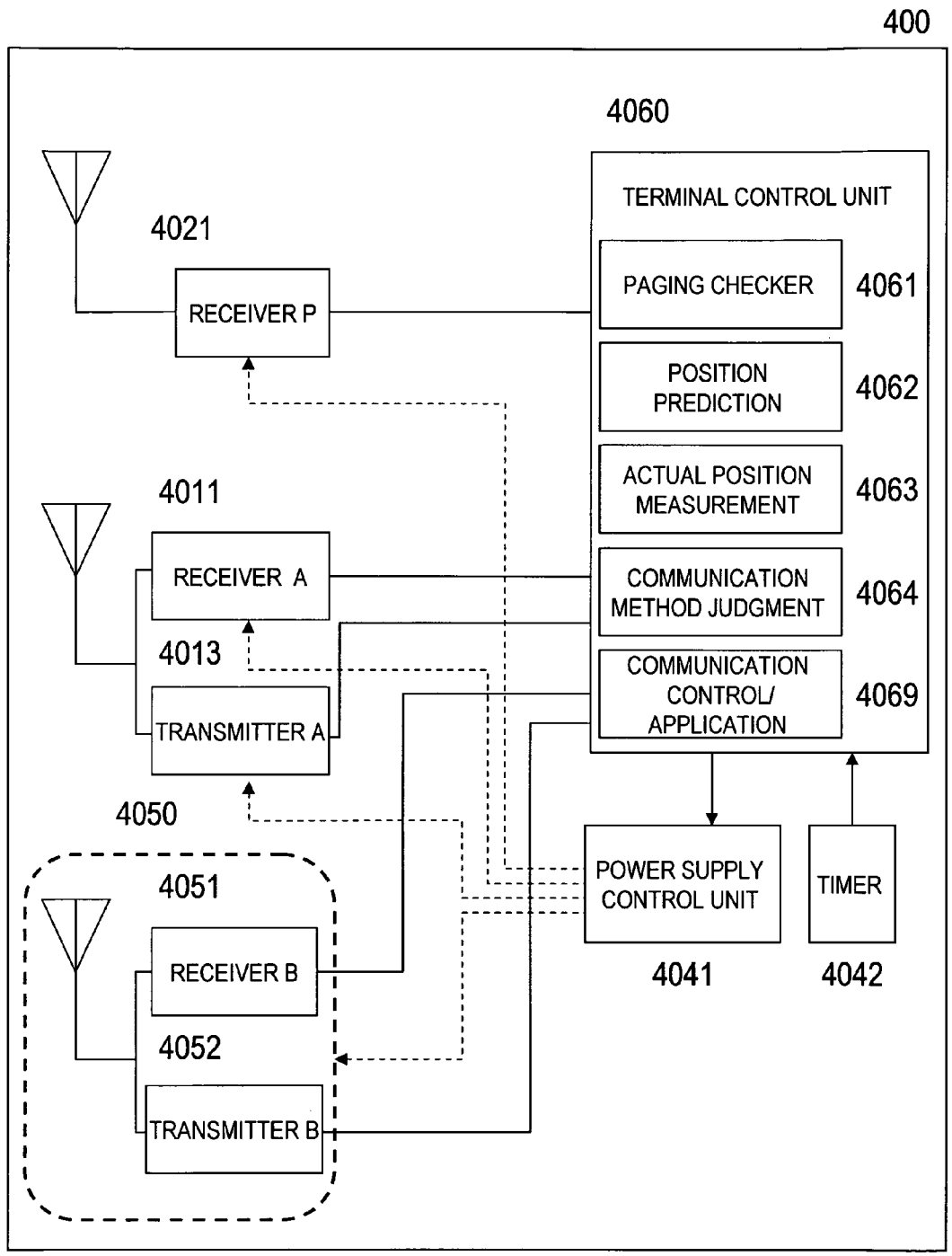
FIG. 2 is a block diagram showing a terminal configuration according to a first embodiment of this invention.

FIG. 2 shows a configuration example of the terminal 400.

The terminal 400 includes a terminal control unit 4060 for controlling the terminal, a receiver P 4021 for receiving information to perform positioning, a receiver A 4011 for receiving an electric wave from the cellular access point, a transmitter A 4013 for transmitting an electric wave to the cellular access point, a receiver B 4051 for receiving an electric wave from an access point other than the cellular access point, a transmitter B 4052 for transmitting an electric wave to the access point other than the cellular access point, a power supply control unit 4041 for controlling a power supply of each unit, and a timer 4042 for notifying of various timings.

The receiver B 4051 and the transmitter B 4052 will generically be referred to as a communication unit B 4050. A plurality of communication units B 4050 may be disposed.

The terminal 400 is generally operated by limited power supply resources such as a battery. Thus, when communication is unnecessary, power supply of an unused portion is cut to reduce power supply consumption. On the other hand, to enable communication from the communication partner 410, whether communication is necessary at a certain timing has to be investigated. According to this invention, whether communication to the terminal 400 is required is checked based on a paging packet periodically transmitted from the cellular access point 600, which is a function of the cellular system.

Figure 3:
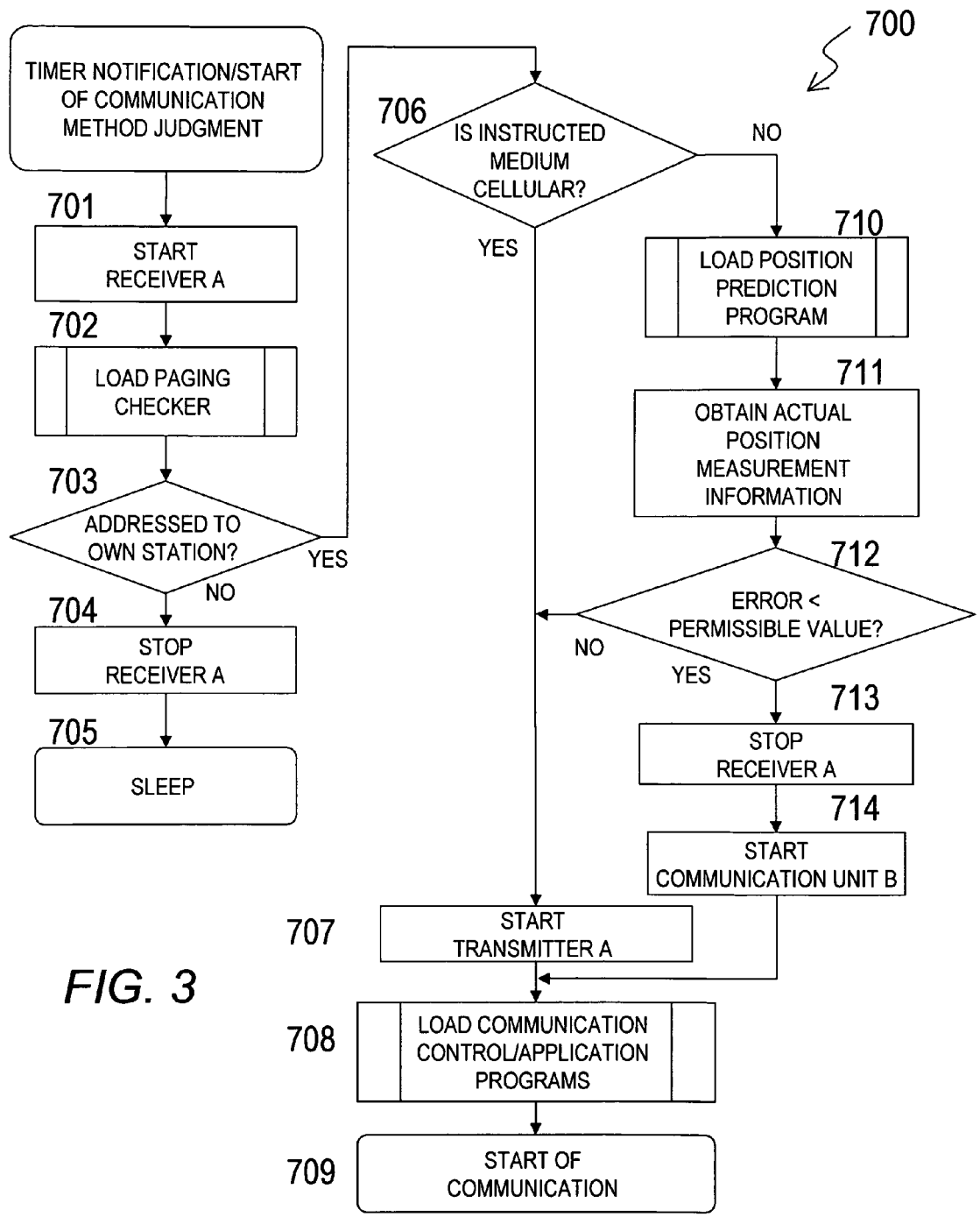
FIG. 3 is a flowchart of terminal control according to the first embodiment of this invention.

Referring to FIGS. 2 and 3, an operation in the case where the terminal 400 is in a sleep status will be described in detail. In FIG. 2, a solid line indicates a flow of data, and a dotted line indicates a flow of a power supply control signal.

In the sleep status, the terminal 400 cuts power supply except that for the timer 4042 and the power supply control unit 4041 to reduce power supply consumption.

The timer 4042 starts the terminal control unit 4060 via the power supply control unit 4041 by a timing of transmitting of a paging packet from the cellular access point 600.

Based on a notification from the timer 4042, the terminal control unit 4060 checks presence of communication according to a flowchart 700 of FIG. 3.

According to the timer notification/communication system judgment start process 700, first, in Step 701, power supply of the receiver A 4011 is turned on to start the receiver A 4011.

In Step 702, a paging checker 4061 is loaded to check reception of a paging packet and presence of a communication request.

In Step 703, a result of the paging checker is checked. If a communication request addressed to an own station cannot be received, in Step 704, power supply of the receiver A 4011 is cut. In Step 705, power supply of terminal control unit 4060 itself is also cut to set a sleep status.

On the other hand, if the paging packet includes a communication request addressed to the own station, the process proceeds from Step 703 to Step 706. In Step 706, if communication by the cellular system is instructed by the communication method 7003, to start communication by the cellular system, the transmitter A 4013 is started in Step 707, and then a program for communication or an application program is loaded in Step 708 to change the process to normal processing.

If a communication method other than the cellular system is notified, in Step 710, a position prediction program 4062 is loaded to obtain the predicted position 101. In Step 711, the actual measured position 102 of an own station position is obtained. Then, in Step 712, the error 200 is compared with the permissible value 201 (refer to FIG. 1). If a result of the comparison shows that the error 200 is smaller than the permissible value 201, to start communication by the system other than the cellular system, in Step 713, the receiver A 4011 of the cellular system is stopped to start the communication unit B 4050. In Step 708, the program for communication or the application program is loaded to change the process to normal processing.

If it is judged in Step 712 that the error 200 is larger than the permissible value 201, to perform communication by the cellular system, in Step 707, the transmitter A 4013 is started. Then, after the processing in Step 708, the process changes to normal processing.

Figure 4:
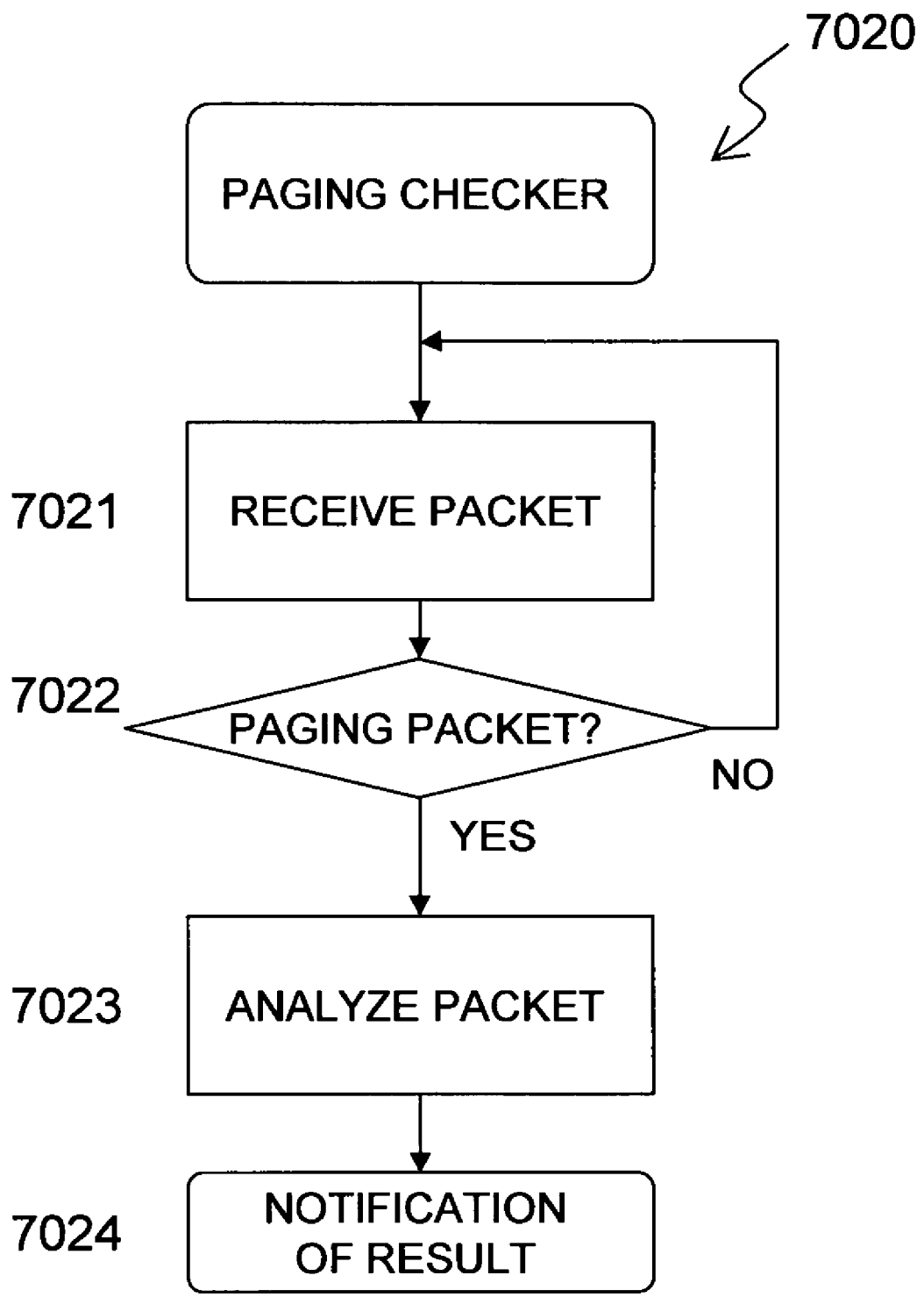
FIG. 4 is a flowchart of an operation of a paging checker according to the first embodiment of this invention.

Referring to FIG. 4, an operation of the paging checker 4061 will be described.

When loaded, in Step 7021, the paging checker 4061 waits for packet reception of the receiver A 4011.

Then, in Step 7022, the paging checker 4061 judges whether the received packet is a paging packet. If a result shows that the received packet is not a paging packet, the process returns to Step 7021.

If the received packet is a paging packet, in Step 7023, the paging checker 4061 analyzes the received packet to check presence of information addressed to its own terminal and to extract information on communication method 7003.

In Step 7024, the paging checker 4061 returns a result to Step 702 which is the loading source.

Figure 12:
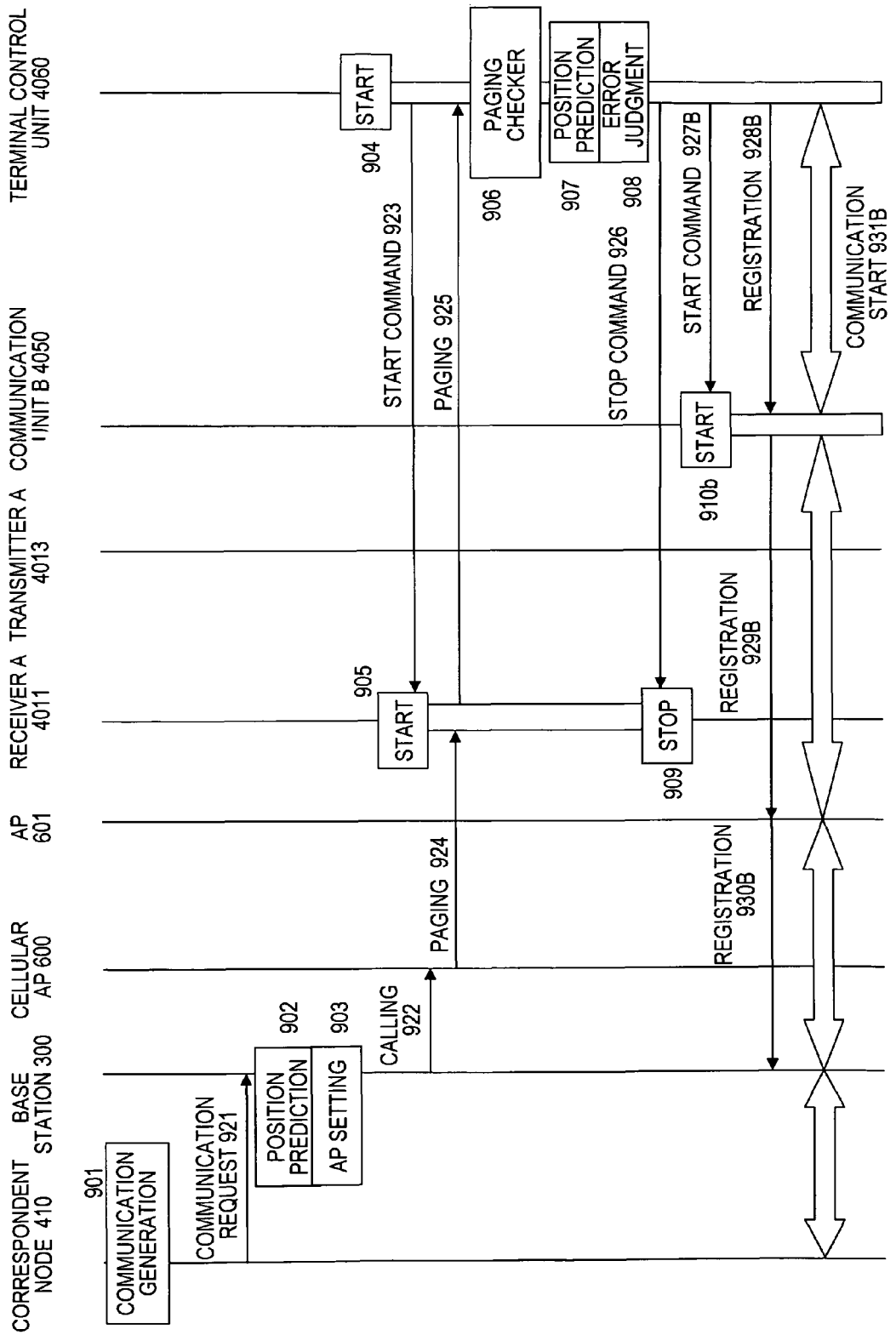
FIG. 12 is a diagram showing a relation during communication using a second communication unit according to the first embodiment of this invention.

Referring to FIG. 12, an operation of each unit before communication is started by using a second communication method will be described.

At a timing 901, the correspondent node 410 starts communication with the terminal 400.

The correspondent node 410 notifies the base station 300 of a communication request 921 according to a network protocol.

The base station 300 predicts a position of the terminal 400 (902), and refers to information of the access point position database 500 to set the access point 601 to be used for communication (903).

The base station 300 makes a call 922 to the terminal 400 through the cellular access point 600. The cellular access point 600 transmits the call as paging 924 to the terminal 400 by containing the terminal ID 7002 of the terminal 400 and the communication method 7003 in the paging packet 70.

Upon start of the terminal control unit 4060 (904), the receiver A 4011 is started by a start command 923 (905).

Upon reception of the paging 924 at the receiver A 4011, the paging packet 925 is processed by the paging checker 4061 (906), and position prediction similar to that of the base station 300 is carried out (907).

An error of a positioning result is judged (908).

It has been presumed that the second communication method is used. Thus, a stop command 926 is issued to the receiver A 4011, and a start command 927B is issued to the second communication unit B 4050.

Then, through the communication unit B 4050, the terminal 400 is registered for the base station 300 (928B, 929B and 930B) to start communication (931B).

Instruction of a proper access point by the base station enables start of communication through use of an optimal communication method without any transmission by a cellular system of large power supply consumption. Thus, power supply consumption can be reduced, and an optimal communication method can be started at high speed.

Figure 13:
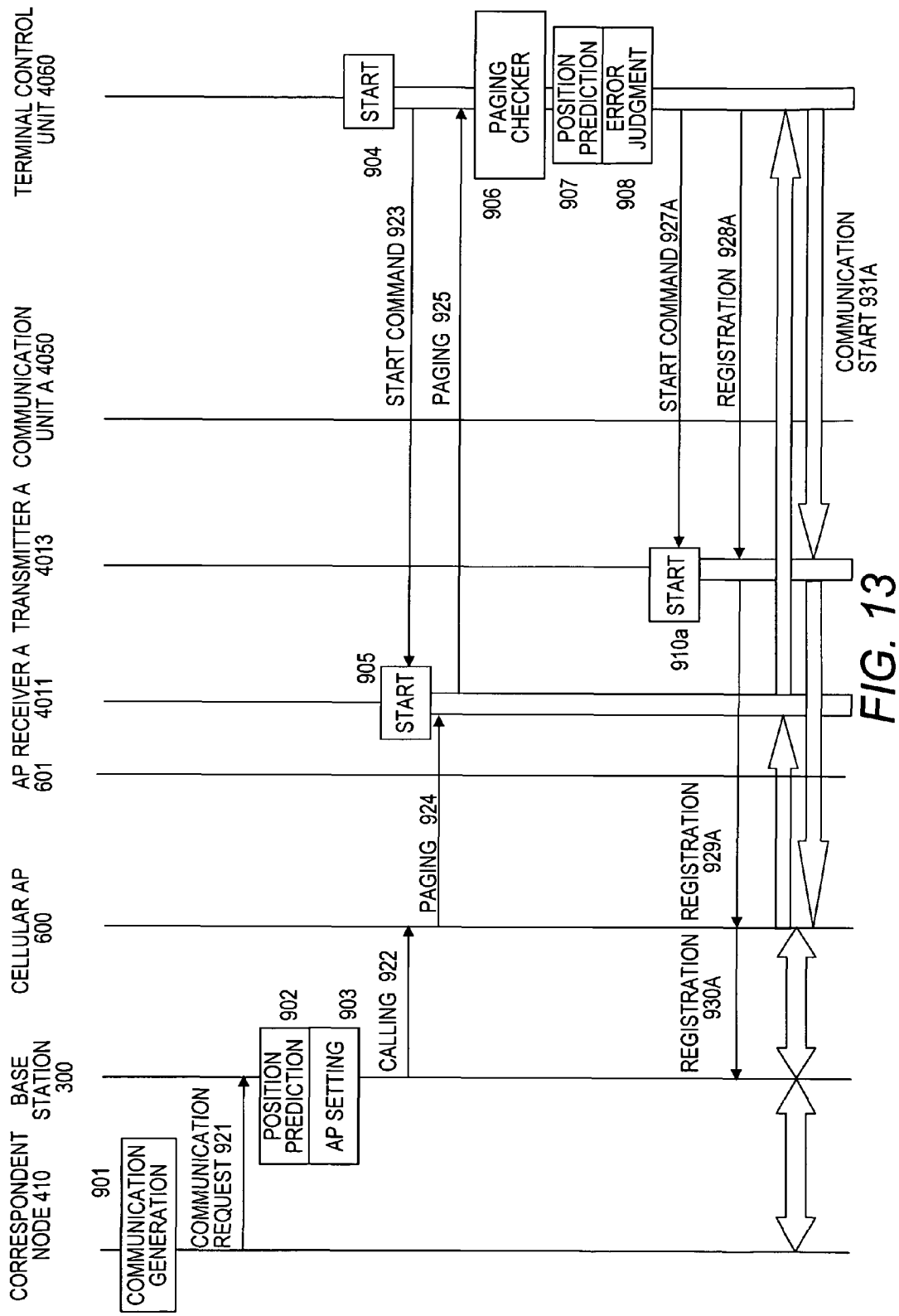
FIG. 13 is a diagram showing a relation during communication using a cellular system according to the first embodiment of this invention.
Figure 14:
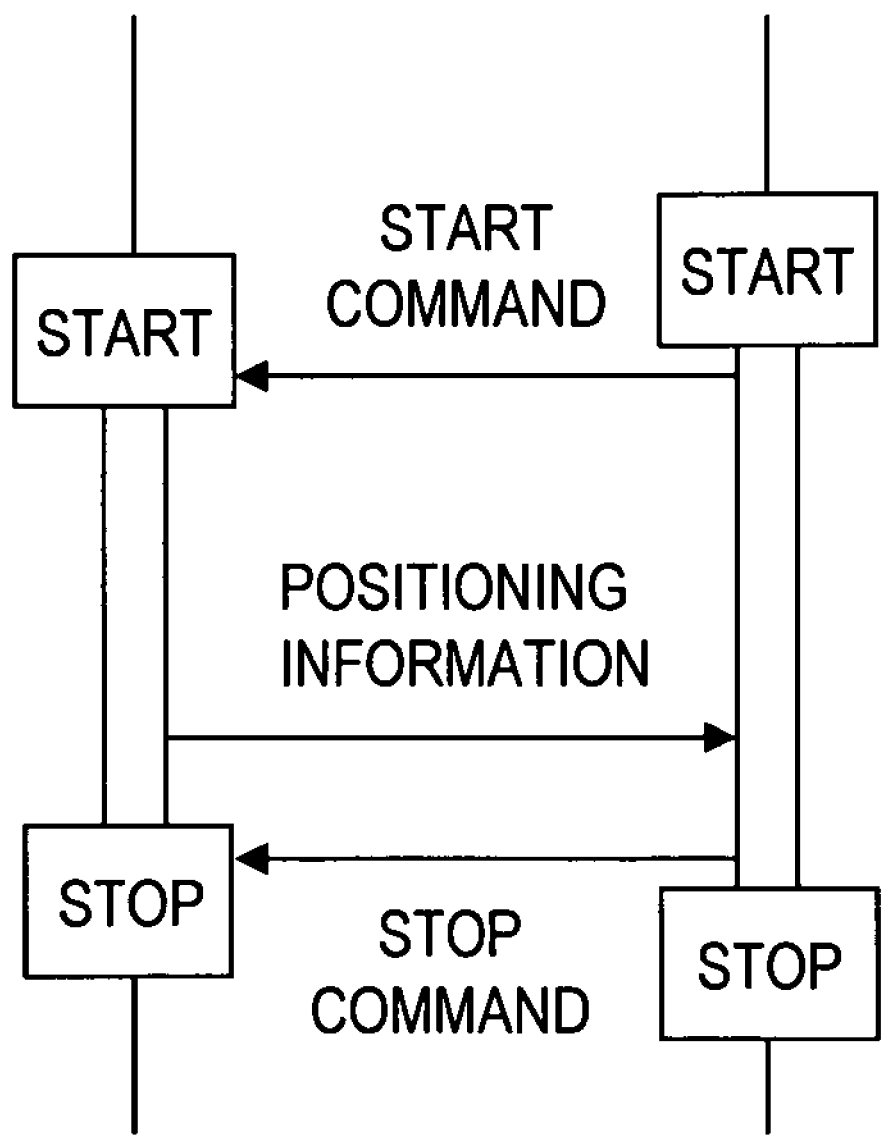
FIG. 14 is a diagram showing a relation during actual position measurement according to the first embodiment of this invention.

Referring to FIG. 13, a relation in the case where communication is started by using the cellular system will be described. The process until Step 908 is similar to that of FIG. 12, and thus the description thereof will be omitted.

If it is determined to perform communication by using the cellular system in Step 908, the transmitter A 4013 is started to register the terminal by using the cellular system (928A, 929A, and 930A).

Then, communication is carried out by using the cellular system (931A).

In this case, a communication system is determined without turning on power supply of the communication unit B 4050. Thus, even if there is a distance from the designated access point 601, a period of time from a communication establishing failure of the access point 601 to a re-registration operation of the cellular communication, unit can be shortened, and power supply consumption can be reduced.

Figure 5:
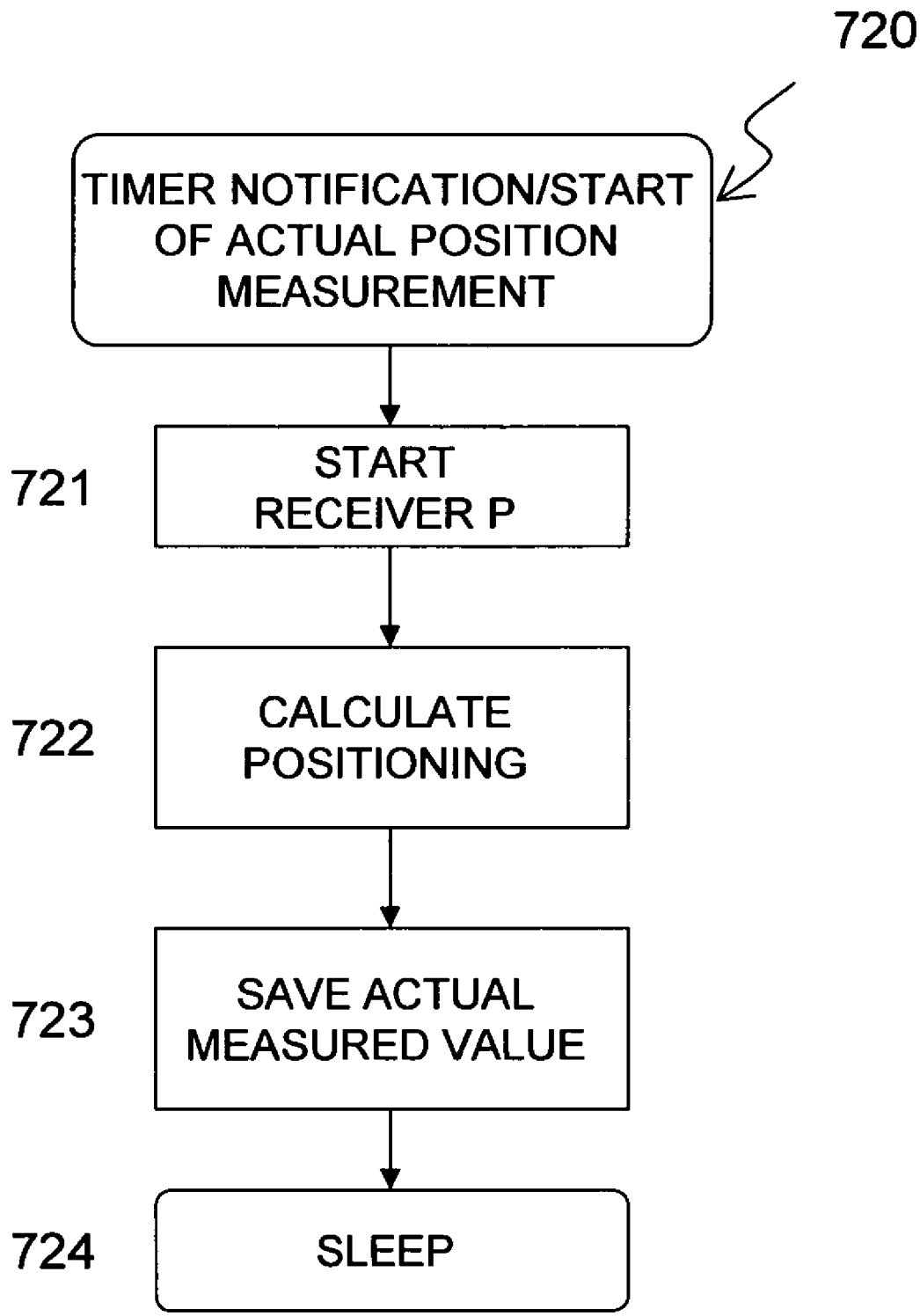
FIG. 5 is a flowchart of actual position measurement according to the first embodiment of this invention.

Referring to FIG. 5, an example of an actual measurement process of the terminal position will be described.

By the timer 4042, the terminal control unit 4060 is started at a predetermined timing, thereby starting an actual position measurement program 4063. The actual position measurement program 4063 measures the terminal position according to a flowchart 720.

In Step 721, the terminal control unit 4060 starts the receiver P 4021.

If the receiver P 4021 includes, for example, a GPS receiver, an electric wave from the GPS can be received. Based on a received GPS signal, positioning calculation is carried out in Step 722 to obtain the terminal position 102.

In Step 723, the terminal position 102 is stored in a storage area (not shown) provided in the terminal control unit 4060 to be used in Step 711 of a timer notification/communication system judgment start process 700.

After end of the process, in Step 724, power supply of the terminal control unit 4060 itself is turned off to set the terminal 400 in a sleep status.

Periodic starting of the actual position measurement program enables continuous capture of signals from a GPS satellite.

If electric waves can be received from a plurality of access points not during positioning by the GPS but during reception of a paging packet, a position of an own terminal may be specified by using three-point measurement. A marker may be buried in the ground or a wall, and the position of the own terminal may be specified by receiving information transmitted from the marker.

As a position prediction method carried out between the base station and the terminal, for example, a method of linearly approximating a moving direction and speed of the terminal from position registration information before a sleep status is available. In the case of a terminal which can use a navigation system or the like, a method of predicting a current position presuming a movement on a road or a railroad is available.

A prediction system may be changed according to moving speed. For example, if moving speed is low, it is judged to be walking around, and presence in substantially the same area is presumed. On the other hand, if moving speed is high, it is judged as movement by car or by rail, and prediction using linear approximation or a map can be employed.

To prepare for acquisition of a highly accurate prediction system in the future, the terminal position prediction method may be changed from the base station.

Second Embodiment

A second embodiment will be described.

Figure 6:
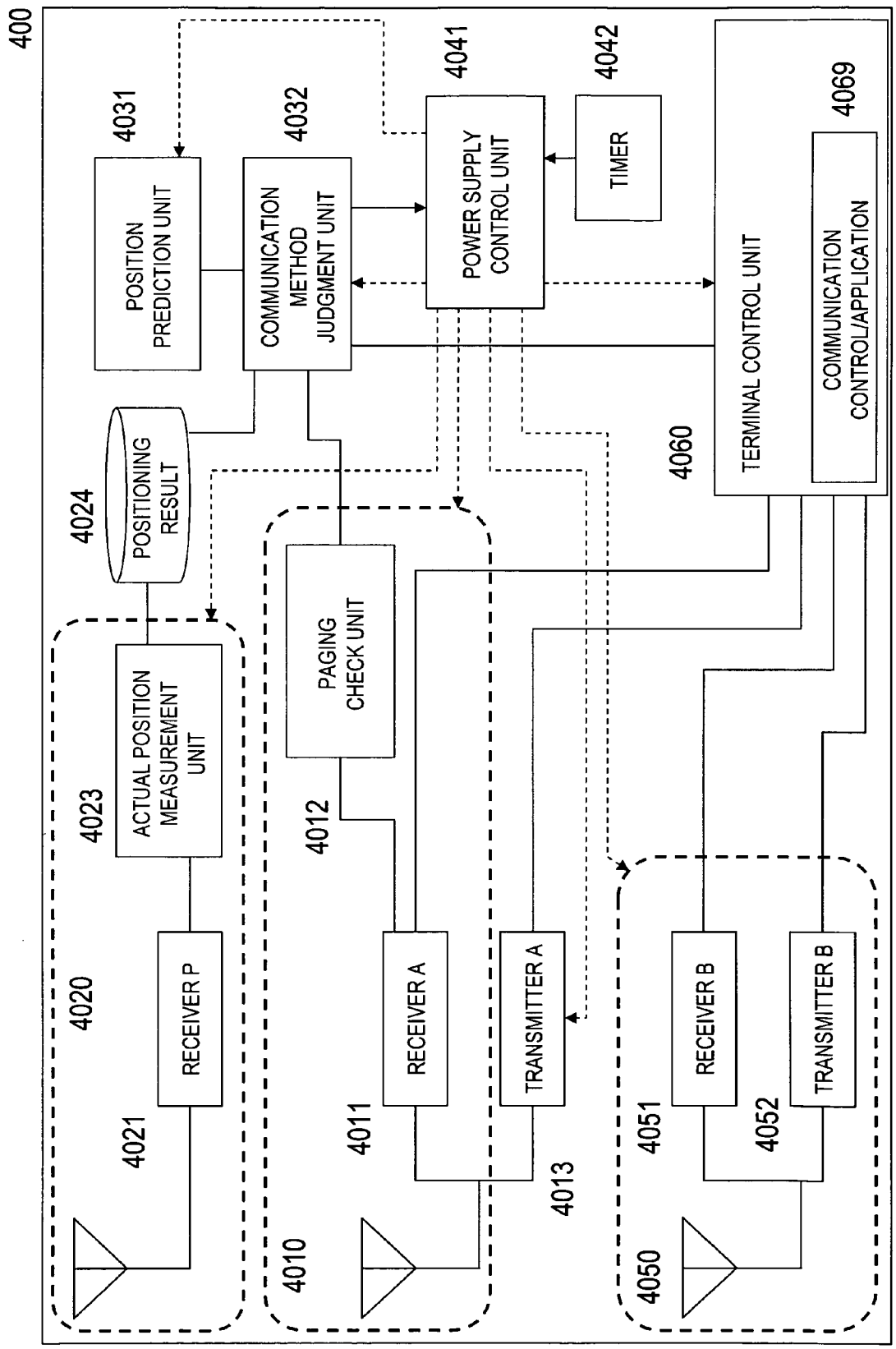
FIG. 6 is a block diagram showing a terminal configuration according to a second embodiment of this invention.

FIG. 6 shows a second configuration example of the terminal 400.

The second embodiment enables fine power supply control by distributing control. In FIG. 6, a solid line indicates a flow of data, and a dotted line indicates a flow of a power supply control signal.

The terminal 400 includes a plurality of domains whose power supply can be individually controlled. The domain includes a cellular reception domain 4010 for receiving an electric wave of a cellular system, a transmitter A 4013 for transmitting an electric wave of a cellular system, a second communication domain 4050 for communication with an access point other than the cellular access point, a position prediction unit 4031, a communication method judgment unit 4032, a terminal control unit 4060, and a positioning domain 4020 for positioning. The domain further includes a power supply control unit 4041 for controlling power supply, a timer 4042 for counting various timings, and a positioning result 4024 for holding a result of the positioning domain.

The cellular reception domain 4010 includes a receiver A 4011 for receiving an electric wave of the cellular system, and a paging check unit 4012.

The second communication domain 4050 includes a receiver B 4051 and a transmitter 4052.

The positioning domain 4020 includes a receiver P 4021 for receiving an electric wave for positioning, and an actual position measurement unit 4023 for measuring a position based on a received signal.

The timer 4042 notifies the power supply control unit 4041 of a timing for transmitting a paging signal from the cellular access point 600.

The power supply control unit 4041 starts a communication method judgment unit 4032 according to a timing signal from the timer 4042.

Figure 7:
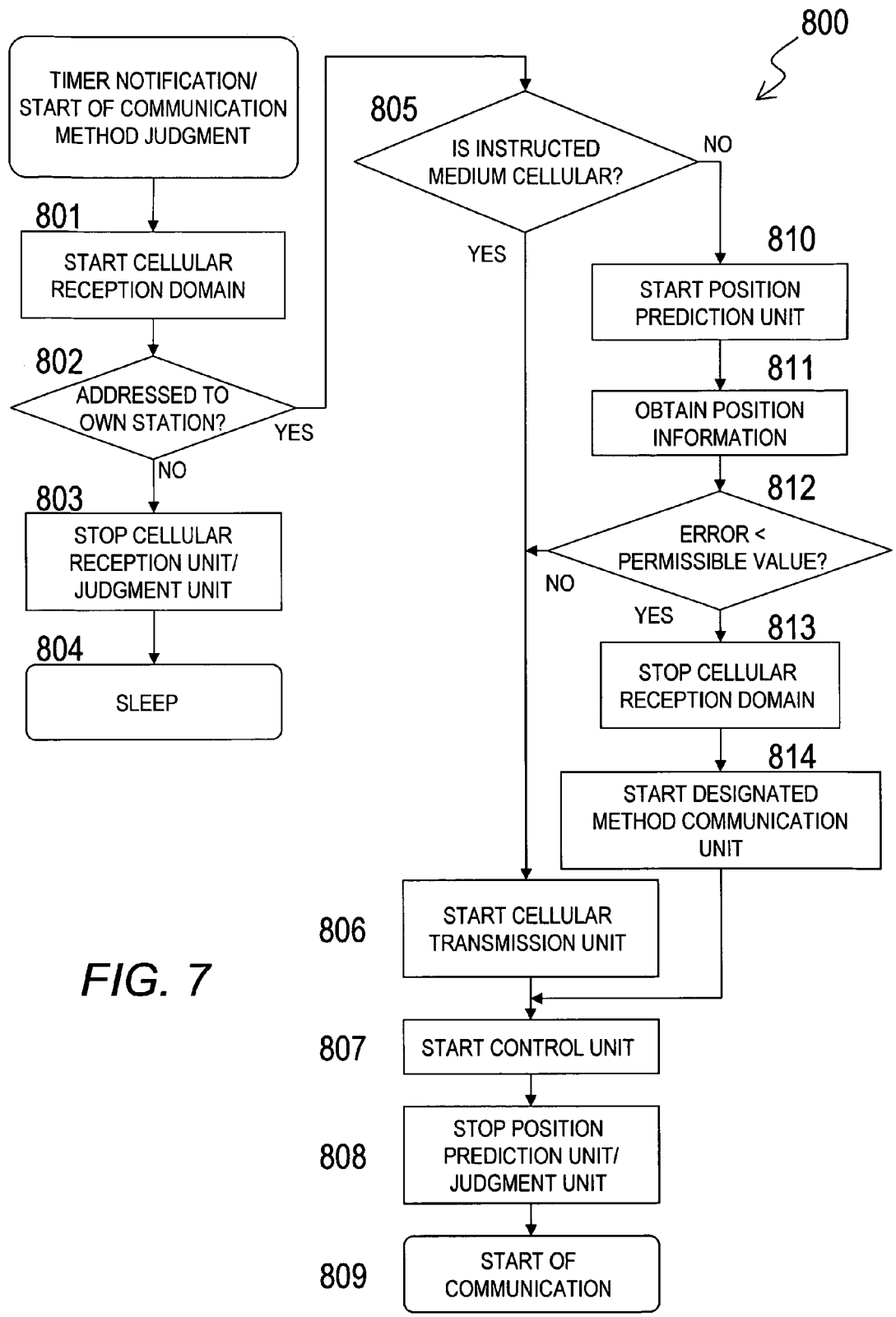
FIG. 7 is a flowchart of terminal control according to the second embodiment of this invention.

Referring to FIG. 7, an operation of the communication method judgment unit 4032 will be described.

In Step 801, the communication method judgment unit 4032 starts the cellular reception domain 4010, and waits for information from the paging check unit 4012.

In Step 802, upon reception of a judging result of the paging check unit 4012, whether a paging signal contains information addressed to an own station is judged. The process proceeds to Step 805 if the paging signal contains information addressed to the own station, or to Step 803 if not.

In Step 803, power supply of the cellular reception domain 4010 and power supply of the communication method judgment unit 4032 themselves are cut to return the process to a sleep status (804).

In Step 805, whether a system instructed from the base station is a cellular system is judged. If a result shows that communication by the cellular system has been instructed, the process proceeds to Step 806, or to Step 810 if communication by a system other than the cellular system has been instructed.

In Step 810, the position prediction unit 4031 is started to obtain a predicted position 101. In Step 811, the positioning result 4024 is obtained, and an error 200 is obtained.

Then, in Step 812, the error 200 is compared with a permissible value 201 (refer to FIG. 1). If a result shows that the error 200 is smaller than the permissible value 201, to start communication by a system other than the cellular system, the process proceeds to Step 813. On the other hand, if it is judged in Step 812 that the error 200 is larger than the permissible value 201, the process proceeds to Step 806.

In Step 813, the cellular reception domain 4010 is stopped to reduce power supply consumption. In Step 814, a communication domain 4050 corresponding to a communication method designated from the base station 300 is started to proceed to Step 807.

In Step 806, to communicate by using the cellular system, the transmitter A 4013 is started to proceed to Step 807.

In Step 807, the terminal control unit 4060 is started to communicate. In Step 808, the position prediction unit 4031 and the communication method judgment unit 4032 are stopped, and the process changes to a normal communication status under control of the terminal control unit 4060 (809).

Figure 8:
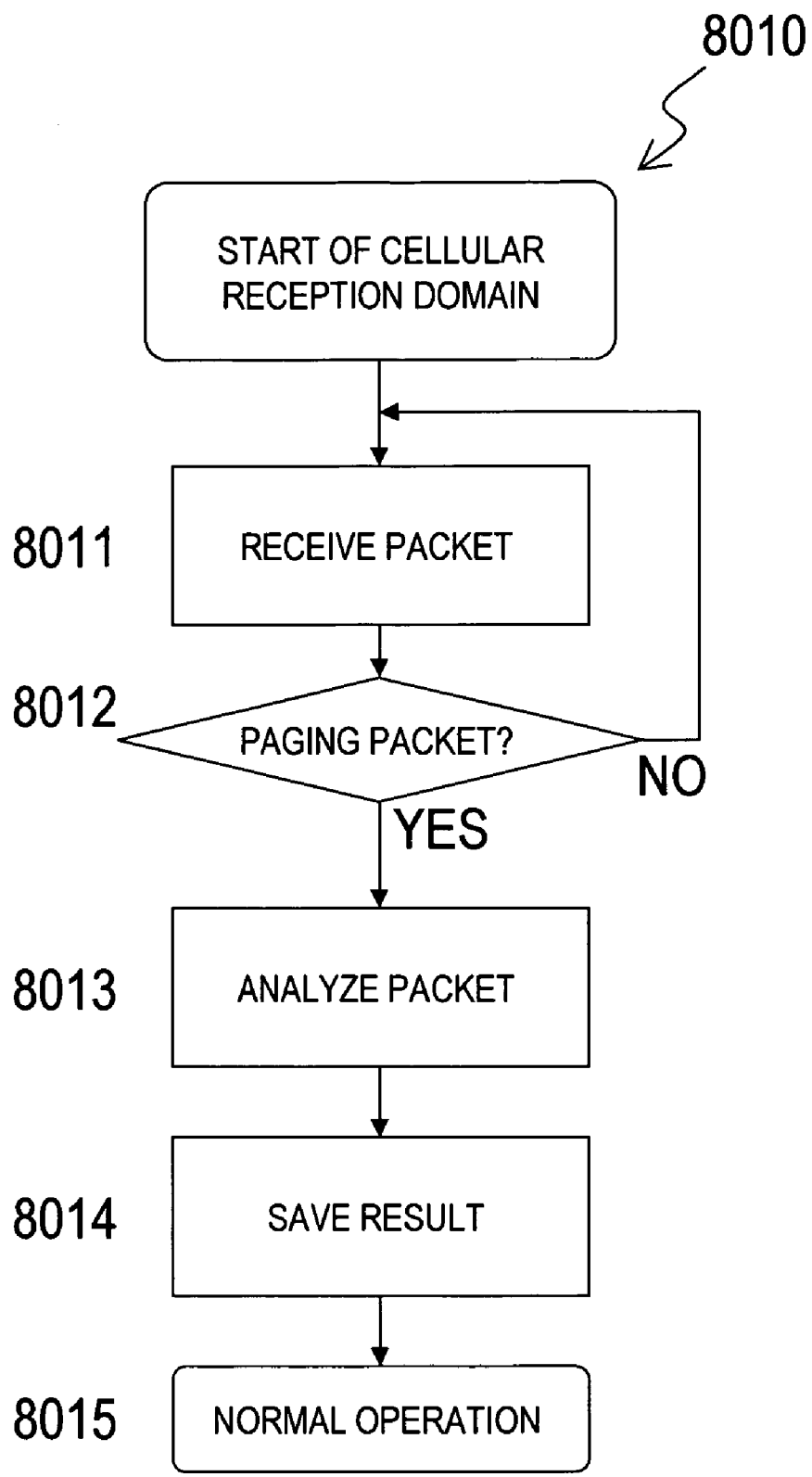
FIG. 8 is a flowchart of an operation of a paging checker according to the second embodiment of this invention.

Referring to FIG. 8, an operation of the paging check unit 4012 by a cellular reception domain start process 8010 will be described.

The paging check unit 4012 is started simultaneously with power supply-on for the cellular reception domain 4010.

In Step 8011, the process waits for packet reception of the receiver A 4011. In Step 8012, whether the received packet is a paging packet is judged.

If a result shows that the received packet is not a paging packet, the process returns to Step 8011.

On the other hand, if the received packet is a paging packet, the received packet is analyzed in Step 8013 to check presence of information addressed to the own terminal and to extract information on the communication method 7003.

In Step 8014, an analyzing result is returned to Step 801 which is the loading source.

Figure 9:
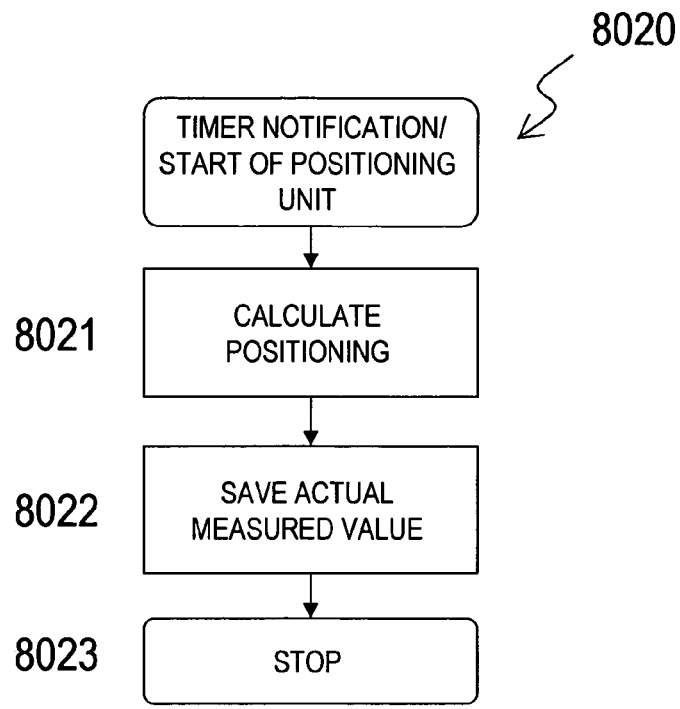
FIG. 9 is a flowchart of actual position measurement according to the second embodiment of this invention.

Referring to FIG. 9, an example of an actual measurement process 8020 of a terminal position will be described.

By the timer 4042, the positioning domain 4020 is started at a predetermined timing to start positioning of the terminal. The actual position measurement unit 4023 measures the terminal position according to a flowchart 8020.

In Step 8021, a terminal position 102 is obtained based on information from the receiver P 4021. For example, an electric wave is received from a GPS satellite to obtain the terminal position 102.

In Step 8022, the obtained terminal position 102 is recorded in the positioning result 4024. The positioning result 4024 is a storage area such as a memory.

Upon end of the process, power supply of the positioning domain 4020 is cut in Step 8023.

Third Embodiment

Referring to FIGS. 18, 19, and 22 to 24, a third embodiment will be described.

According to this embodiment, in place of position prediction by the terminal 400 itself, position prediction at the base station 300, stored in a paging packet is received, and this position prediction is compared with an actual measured value.

Figure 18:
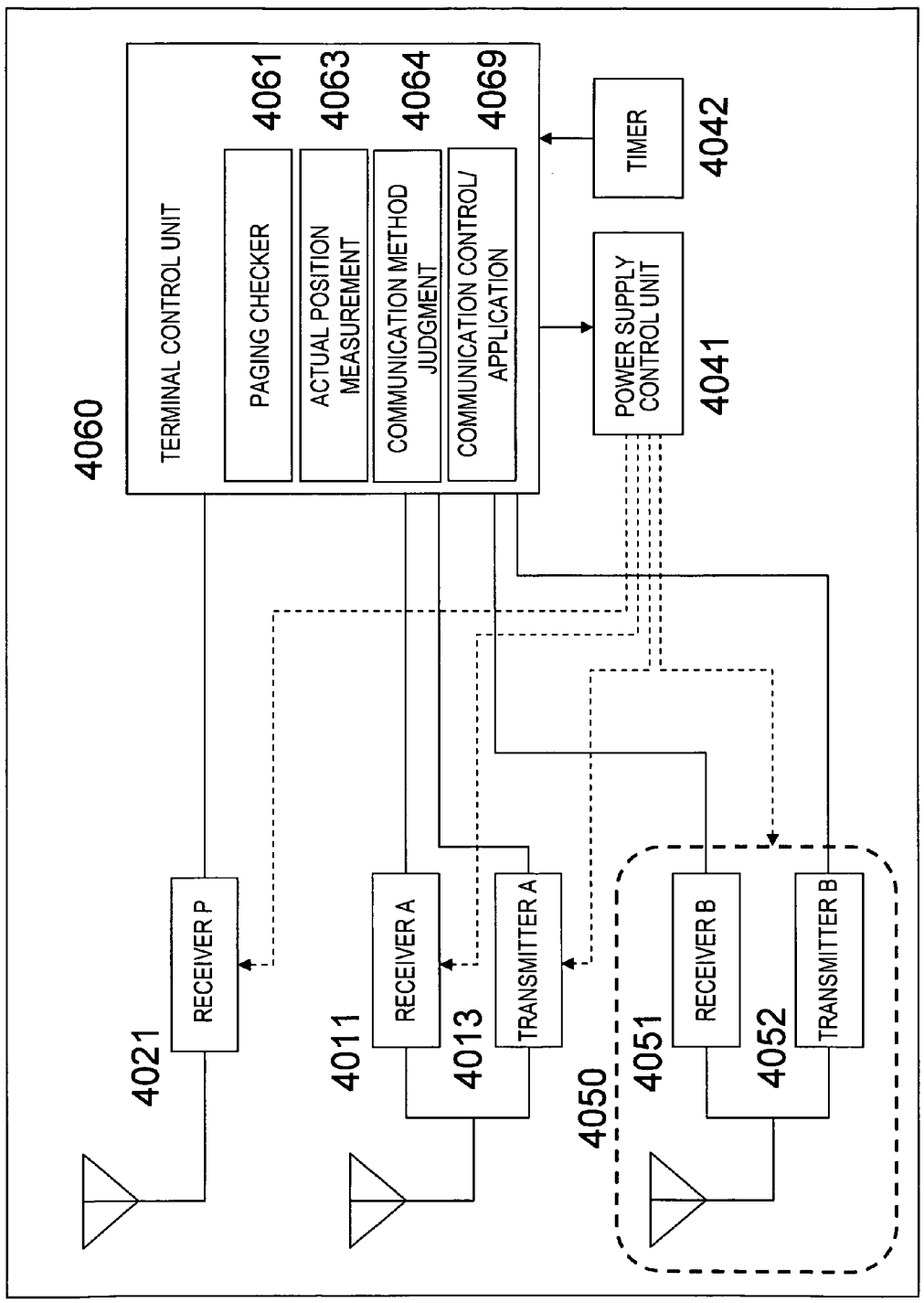
FIG. 18 is a block diagram showing a terminal configuration according to a third embodiment of this invention.

FIG. 18 corresponds to FIG. 2 of the first embodiment. The position prediction program 4062 used in the first embodiment is unnecessary.

Figure 19:
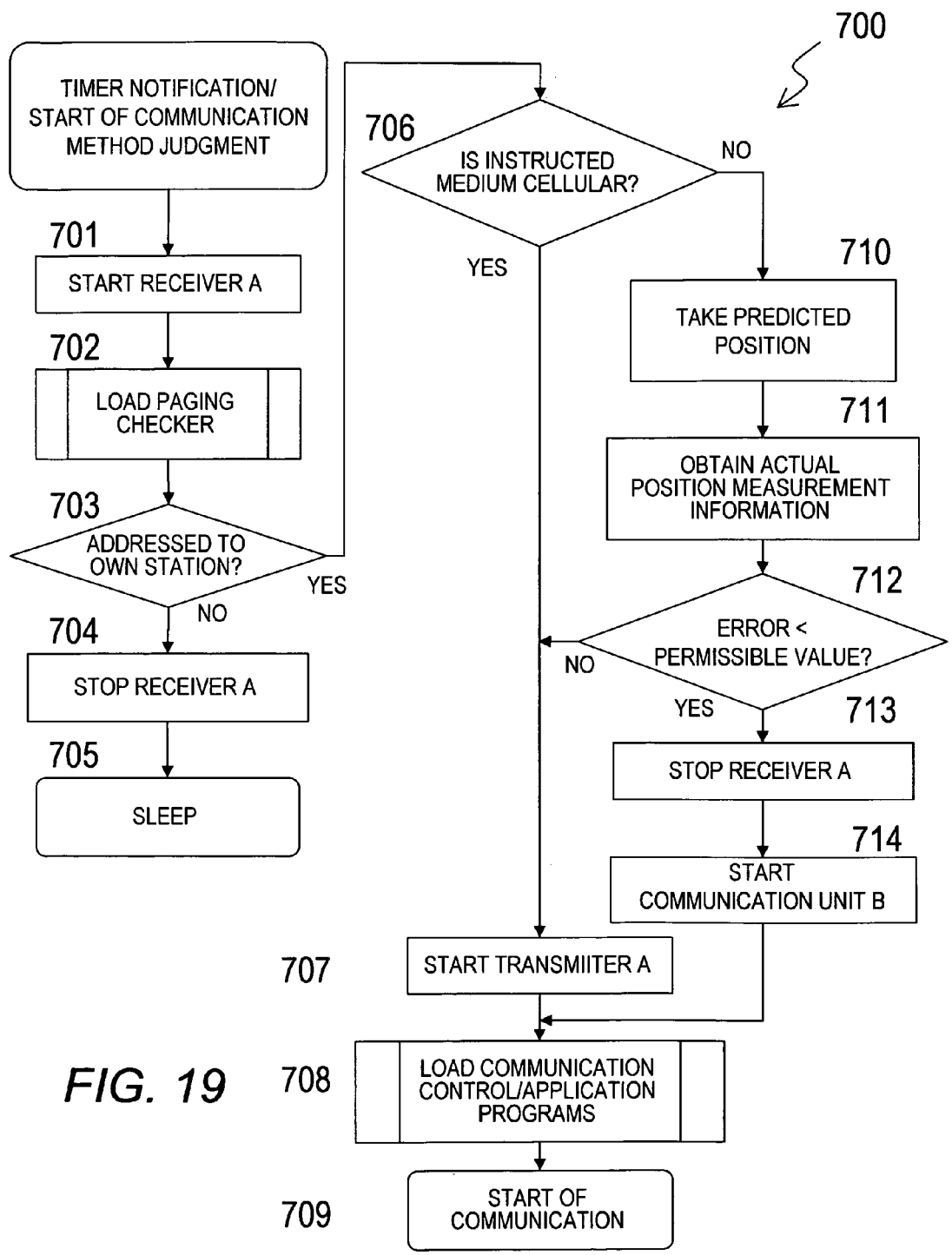
FIG. 19 is a flowchart of terminal control according to the third embodiment of this invention.

FIG. 19 corresponds to FIG. 3 of the first embodiment. The base station 300 notifies the terminal 400 of a communication start by containing not only a communication method but also information on a predicted position in a paging packet 70.

Figure 22:
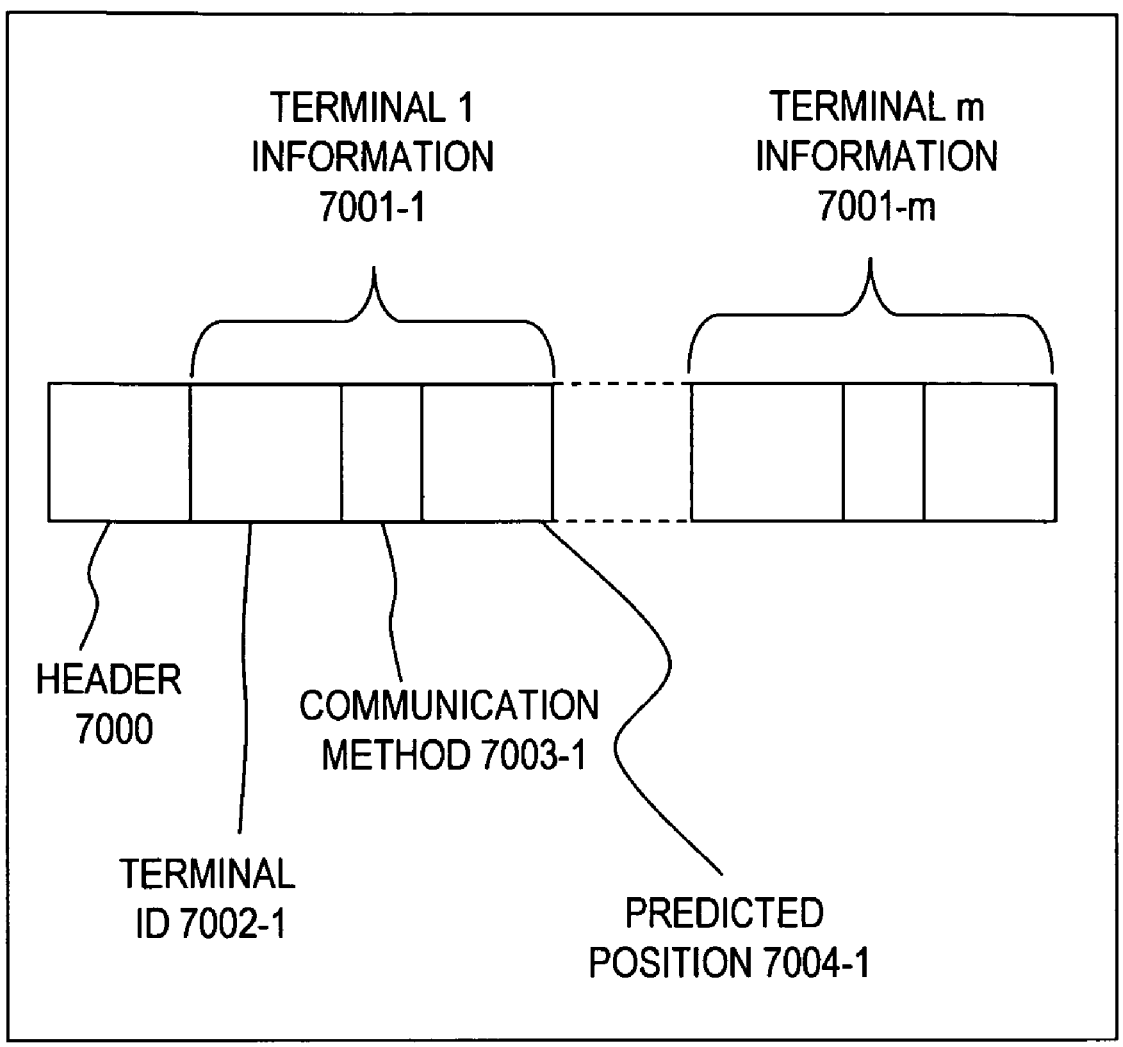
FIG. 22 is a diagram showing a configuration example of a paging packet according to the third and fourth embodiments of this invention.

FIG. 22 corresponds to FIG. 10 of the first and second embodiments. A field 7004-*m* for storing a predicted position is further added to the paging packet 70 used in the first and second embodiments.

Figure 23:
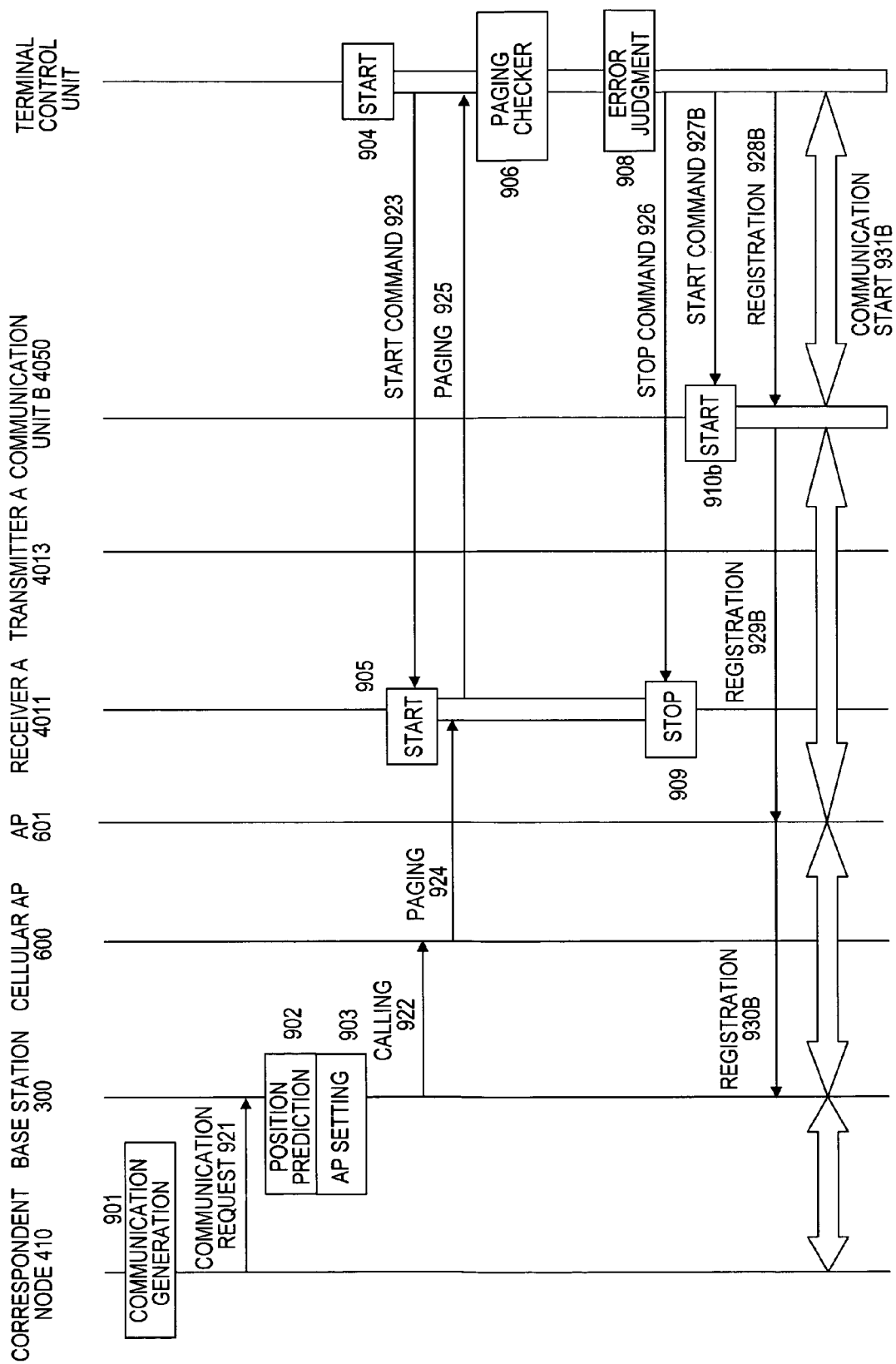
FIG. 23 is a diagram showing a relation during communication using a second communication unit according to the third embodiment of this invention.
Figure 24:
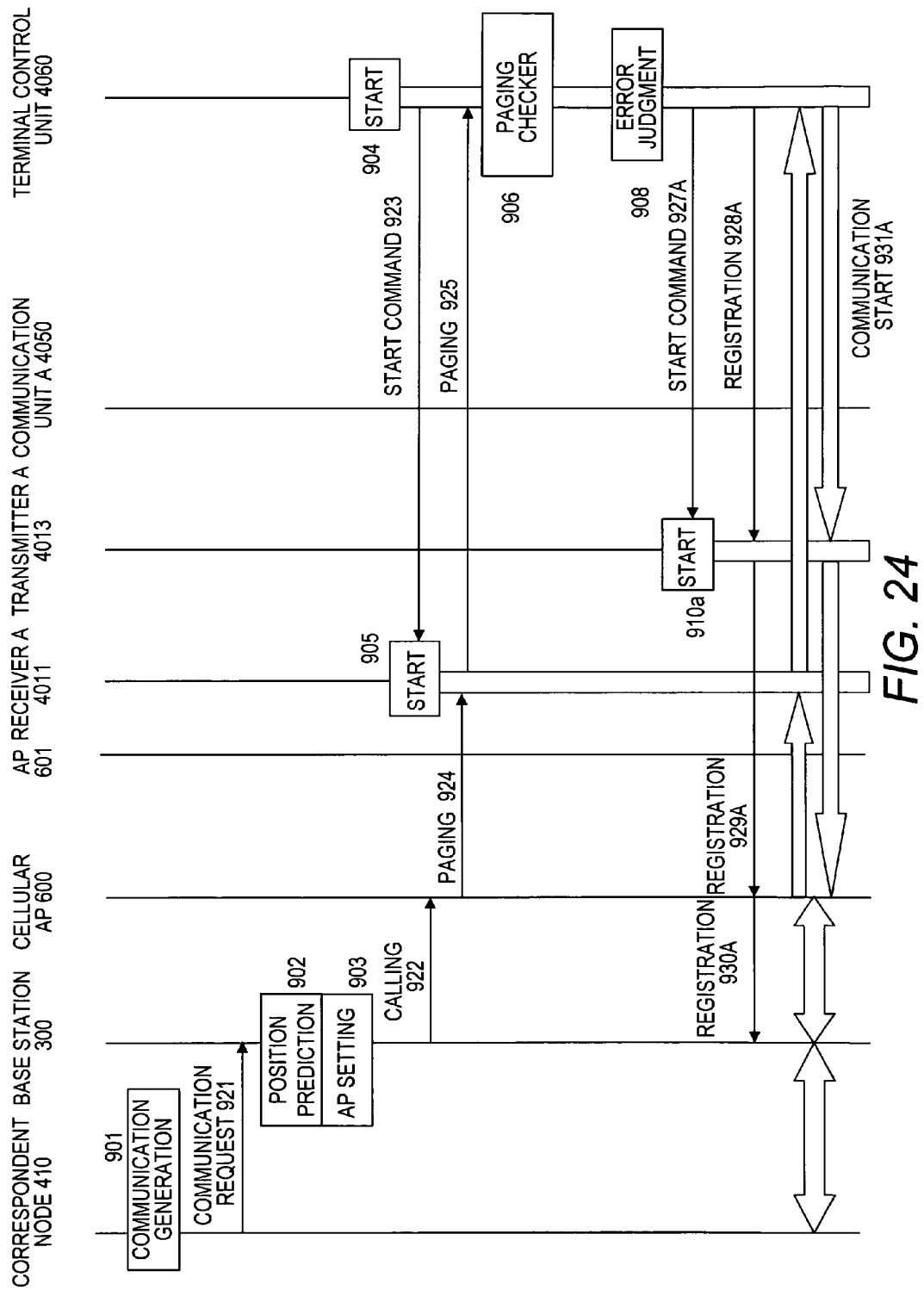
FIG. 24 is a diagram showing a relation during communication using a cellular system according to the third embodiment of this invention.

FIGS. 23 and 24 respectively correspond to FIGS. 12 and 13 of the first embodiment. According to the first embodiment, the position prediction similar to that of the base station 300 is carried out in Step 907. However, this step is unnecessary.

Other components are similar to those of the first embodiment.

The configuration of this embodiment eliminates the necessity for the terminal itself to predict a position, thereby providing the same effects as those of the first embodiment while reducing loads on the terminal.

Fourth Embodiment

Figure 20:
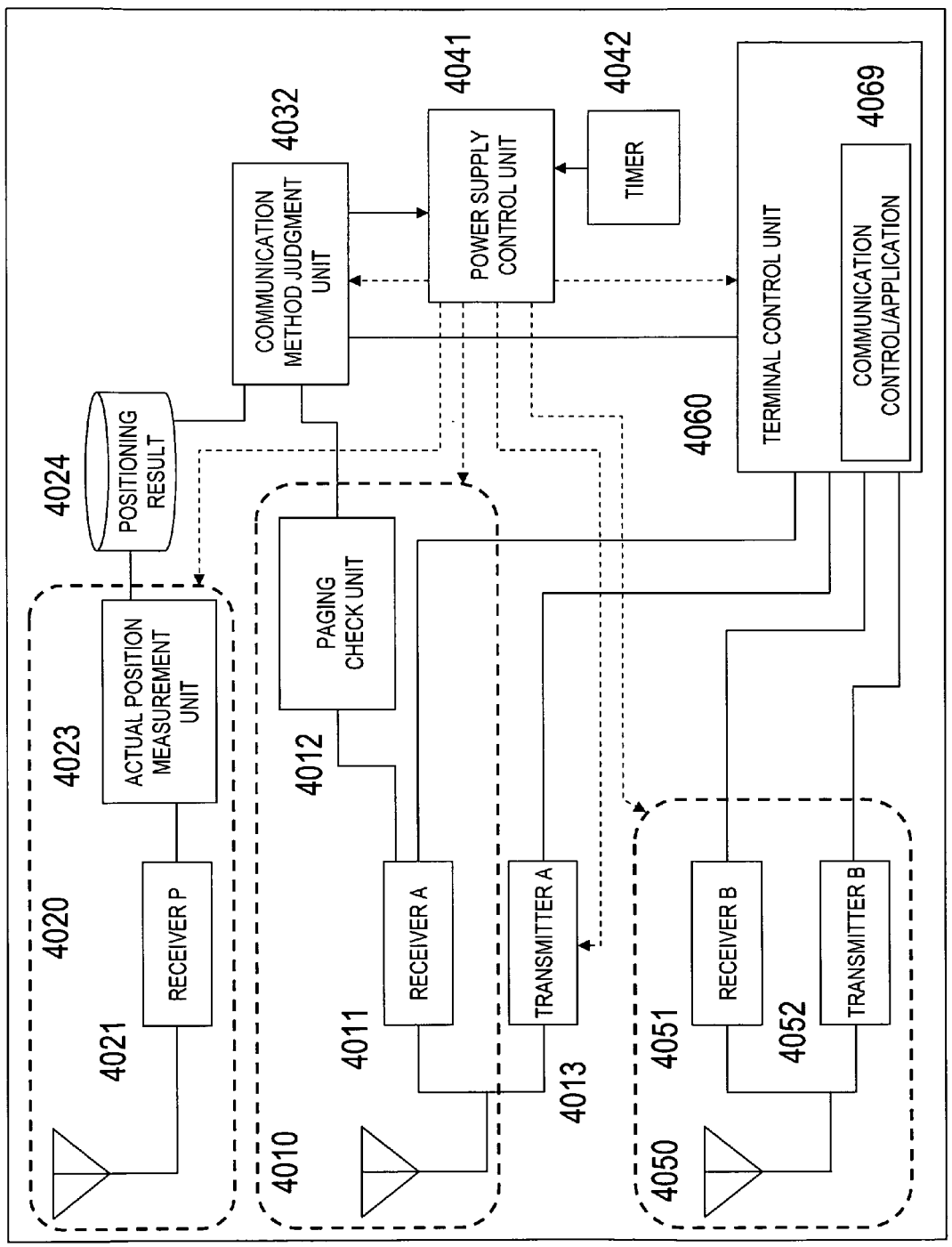
FIG. 20 is a block diagram showing a terminal configuration according to a fourth embodiment of this invention.
Figure 21:
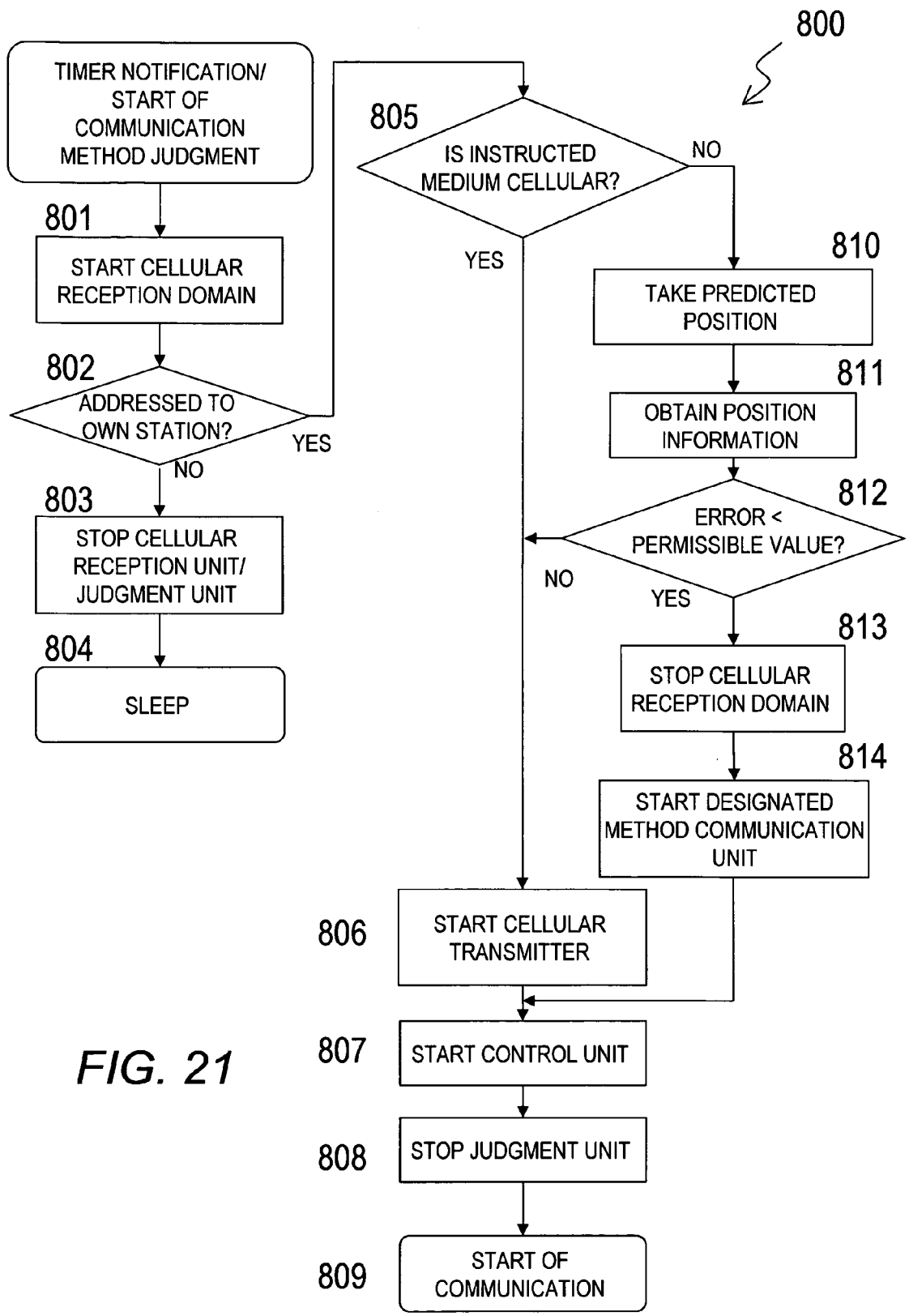
FIG. 21 is a flowchart of terminal control according to the fourth embodiment of this invention.

Referring to FIGS. 20, 21 and 10, a fourth embodiment will be described.

According to this embodiment, in the configuration of the second embodiment, the terminal 400 obtains position prediction by the same method as that of the third embodiment.

FIG. 20 corresponds to FIG. 6 of the second embodiment. The position prediction unit 4031 used in the second embodiment is unnecessary.

FIG. 21 corresponds to FIG. 7 of the second embodiment. In Step 810, a predicted position 101 is taken from a paging packet 70.

The paging packet 70 used in this embodiment is similar to that of FIG. 10.

Other components are similar to those of the second embodiment.

The configuration of this embodiment eliminates the necessity for the terminal itself to predict a position, thereby providing the same effects as those of the second embodiment while reducing loads on the terminal.

While the present invention has been described in detail and pictorially in the accompanying drawings, the present invention is not limited to such detail but covers various obvious modifications and equivalent arrangements, which fall within the purview of the appended claims.

What is claimed is:

1. A communication system, comprising:
a base station; and
a terminal which communicates with the base station through a plurality of communication methods, wherein
the base station is configured to:
predict a position of the terminal;
select a communication method optimal for the terminal based on the predicted position; and
notify the terminal of the selected communication method, and
the terminal is configured to:
measure the position of the terminal by prediction which is similar to the position prediction by the base station; and
select the communication method notified from the base station in the case of which a difference between a result of the position prediction and a result of the measurement is smaller than a predetermined threshold.

2. The communication system according to claim 1, wherein the terminal is configured to select a predetermined communication method in the case of which the difference between the result of the position prediction and the result of the measurement is not smaller than the predetermined threshold.

3. The communication system according to claim 1, wherein the base station is configured to notify the communication method by paging.

4. The communication system according to claim 1, wherein different values are set to the predetermined threshold depending on the plurality of communication methods.

5. The communication system according to claim 1, wherein the base station is configured to provide the predetermined threshold.

6. The communication system according to claim 1, wherein the terminal is configured to measure the position of the terminal by using a GPS system.

7. The communication system according to claim 1, wherein the terminal is configured to measure the position of the terminal by using radio waves from a plurality of access points.

8. A communication terminal, comprising:
- a first receiver for receiving a signal of a first communication method;
- a first transmitter for transmitting a signal of the first communication method;
- a second receiver for receiving a signal of a second communication method;
- a second transmitter for transmitting a signal of the second communication method;
- a third receiver for receiving a signal for positioning;
- a control unit for controlling each unit of the communication terminal;
- a power supply control unit for controlling power supply to the first transmitter, the second transmitter, the first receiver, the second receiver and the third receiver; and
- a timer for supplying a control timing to the power supply control unit,
- wherein the control unit is configured to:
- measure the position of the communication terminal by predicting a position of the communication terminal;
- select a communication method notified from a base station in the case of which a difference between a result of the prediction and a result of the measurement is smaller a predetermined threshold; and
- select a predetermined communication method in the case of which a difference between the result of the prediction and the result of the measurement is not smaller the predetermined threshold.

9. The communication terminal according to claim 8, further comprising a third transmitter for transmitting a signal of the third communication method, and wherein the third receiver is configured to receive a signal of the third communication method.

10. The communication terminal according to claim 8, wherein the position of the communication terminal is measured by using a GPS system.

11. The communication terminal according to claim 8, wherein the position of the communication terminal is measured by using radio waves from a plurality of access points.

12. The communication terminal according to claim 8, wherein the position of the communication terminal is measured by using a signal received by one of the first receiver, the second receiver and the third receiver.

13. A method for selecting a communication method of a terminal in a communication system in which a base station and the terminal communicate through a plurality of communication methods, the terminal including a first communication unit of a first communication method including a first receiver for receiving a signal of the first communication method and a first transmitter for transmitting a signal of the first communication method, the terminal further including a second communication unit of a second communication method including a second receiver for receiving a signal of the second communication method and a second transmitter for transmitting a signal of the second communication method and the terminal further including a control unit, the method comprising:
- receiving, by the first receiver, a notification of a communication method from the base station;
- predicting a position of the terminal;
- measuring a position of the terminal;
- comparing a difference between the predicted position and the measured position with a predetermined threshold;
- selecting a communication method to be used based on a result of the comparison; and
- turning on power supply of one of the first communication unit and the second communication unit corresponding to the communication method selected to be used.

14. The method for selecting a communication method according to claim 13, wherein:
- the first communication method is a cellular system; and
- the receiving the notification of the communication method includes receiving the notification of the communication method included in cellular paging information.

* * * * *